US012272871B2

(12) United States Patent
Li et al.

(10) Patent No.: US 12,272,871 B2
(45) Date of Patent: Apr. 8, 2025

(54) LOW-PROFILE FREQUENCY-SELECTIVE ANTENNA ISOLATION ENHANCEMENT FOR DUAL-POLARIZED MASSIVE MIMO ANTENNA ARRAY

(71) Applicant: Samsung Electronics Co., Ltd., Suwon-si (KR)

(72) Inventors: Jiantong Li, Plano, TX (US); Xinguang Xu, Allen, TX (US); Khurram Muhammad, Southlake, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 17/815,927

(22) Filed: Jul. 28, 2022

(65) Prior Publication Data

US 2023/0052803 A1 Feb. 16, 2023

Related U.S. Application Data

(60) Provisional application No. 63/227,200, filed on Jul. 29, 2021.

(51) Int. Cl.
*H01Q 1/52* (2006.01)
*H01Q 1/48* (2006.01)
(Continued)

(52) U.S. Cl.
CPC ............... *H01Q 1/521* (2013.01); *H01Q 1/48* (2013.01); *H01Q 21/065* (2013.01); *H01Q 5/35* (2015.01)

(58) Field of Classification Search
CPC ........ H01Q 1/521; H01Q 1/48; H01Q 21/065; H01Q 5/35; H01Q 21/24; H01Q 1/523; H01Q 21/06; H01Q 15/006
See application file for complete search history.

(56) References Cited

U.S. PATENT DOCUMENTS 10,847,879 B2 * 11/2020 Le-Ngoc .............. H01Q 21/205
10,886,622 B1 * 1/2021 Patel .................. H01Q 15/0066
(Continued)

FOREIGN PATENT DOCUMENTS

CN 106953173 A 7/2017
CN 110676583 A 1/2020
(Continued)

OTHER PUBLICATIONS

Agarwal, et al.; "Isolation Improvement of 5 GHz WLAN Antenna Array using Metamaterial Absorber", 2016 URSI Asia-Pacific Radio Science Conference, Aug. 21-25, 2016, 4 pages.
(Continued)

*Primary Examiner* — Thai Pham

(57) ABSTRACT

An apparatus can include a substrate, a first antenna panel, a second antenna panel and a wall isolator. The first antenna panel can be coupled on the substrate and comprising an array of first antenna elements. The second antenna panel can be coupled on the substrate comprising an array of second antenna elements. The wall isolator can be coupled on the substrate. The wall isolator can include a first EBG element and a second EBG element. The first EBG element can be positioned along an edge of the first antenna panel for a length of the substrate and configured to reduce surface wave propagation from the array of first antenna elements. The second EBG element can be positioned along an edge of the second antenna panel for a length of the substrate and configured to reduce surface wave propagation from the array of second antenna elements.

20 Claims, 22 Drawing Sheets

(51) Int. Cl.
*H01Q 21/06* (2006.01)
*H01Q 5/35* (2015.01)

(56) References Cited

U.S. PATENT DOCUMENTS

| | | | | |
|---|---|---|---|---|
| 10,938,108 | B2 | 3/2021 | Henry et al. | |
| 11,362,430 | B1 * | 6/2022 | Patel | H01Q 15/0066 |
| 11,552,397 | B2 * | 1/2023 | Tehran | H01Q 9/0414 |
| 2008/0204347 | A1 | 8/2008 | Alvey et al. | |
| 2009/0201212 | A1 | 8/2009 | Sim et al. | |
| 2010/0214160 | A1 | 8/2010 | Smith et al. | |
| 2013/0027269 | A1 | 1/2013 | Orime et al. | |
| 2014/0191907 | A1 | 7/2014 | Cho et al. | |
| 2016/0141748 | A1 | 5/2016 | Tagi et al. | |
| 2016/0344093 | A1 * | 11/2016 | Tagi | H01Q 1/525 |
| 2017/0264012 | A1 * | 9/2017 | Clark | H01Q 1/523 |
| 2017/0264014 | A1 * | 9/2017 | Le-Ngoc | H01Q 21/065 |
| 2020/0259240 | A1 | 8/2020 | Moallem | |
| 2020/0295467 | A1 * | 9/2020 | Marsolais | G01S 7/03 |
| 2021/0028559 | A1 * | 1/2021 | Hwang | H01Q 15/0086 |

FOREIGN PATENT DOCUMENTS

| | | | |
|---|---|---|---|
| CN | 112164889 | A | 1/2021 |
| CN | 112310617 | A | 2/2021 |
| WO | 2021259872 | A1 | 12/2021 |

OTHER PUBLICATIONS

Hwangbo, et al., “Mutual Coupling Reduction Using Micromachined Complementary Meander-Line Slots for a Patch Array Antenna”, IEEE Antennas and Wireless Propagation Letters, vol. 16, 2017, 4 pages.

Ji, et al., “Extending 5G TDD Coverage With XDD: Cross Division Duplex”, IEEEAccess, vol. 9, 2021, 13 pages.

International Search Report and Written Opinion issued Nov. 9, 2022 regarding International Application No. PCT/KR2022/011253, 8 pages.

1 Extended European Search Report issued Oct. 7, 2024 regarding Application No. 22849945.5, 13 pages.

* cited by examiner

2300

2302

LOW-PROFILE FREQUENCY-SELECTIVE ANTENNA ISOLATION ENHANCEMENT FOR DUAL-POLARIZED MASSIVE MIMO ANTENNA ARRAY

CROSS-REFERENCE TO RELATED APPLICATION AND PRIORITY CLAIM

This application claims priority under 35 U.S.C. § 119 (e) to U.S. Provisional Patent Application No. 63/227,200 filed on Jul. 29, 2021, which is hereby incorporated by reference in its entirety.

TECHNICAL FIELD

This disclosure relates generally to multiple-input multiple-output (MIMO) antenna array devices and processes. More specifically, this disclosure relates to a low-profile frequency-selective antenna isolation enhancement for dual-polarized massive MIMO antenna array.

BACKGROUND

There are two main operation modes for cellular communication systems: Time Division Duplexing (TDD) and Frequency Division Duplexing (FDD). The uplink (UL) and downlink (DL) of TDD operate within several distinct time periods, while FDD works with different frequency bands. Compared to FDD, TDD has its unique advantages. For example, TDD can assign time resources to UL and DL based on the specific data traffic of both directions. Typically, the majority of time resources are used by the DL due to its heavy data traffic. In addition, large gap bandwidths are not required between UL and DL channels for TDD systems. For FDD, one advantage is coverage because FDD can access all time resources, while TDD assign a small portion of time resources to UL, thus reducing the overall coverage. Moreover, FDD performs better latency because TDD requires the gap timing period, longer than it of FDD.

SUMMARY

This disclosure provides a low-profile frequency-selective antenna isolation enhancement for a dual-polarized MIMO antenna array.

In a first embodiment, an apparatus includes a substrate, a first antenna panel, a second antenna panel, and an antenna isolator. The first antenna panel is coupled on the substrate and includes an array of first antenna elements. The second antenna panel is coupled on the substrate and includes an array of second antenna elements. The antenna isolator is coupled on the substrate and including a plurality of walls extending outwardly from the substrate along a length of the substrate between the first antenna panel and the second antenna panel. The antenna isolator reduces reduce wave propagation between the array of first antenna elements and the array of second antenna elements.

In a second embodiment, an electronic device includes a MIMO antenna, TX processing circuitry, and RX processing circuitry. The MIMO antenna includes a substrate, a first antenna panel, a second antenna panel, and an antenna isolator. The first antenna panel is coupled on the substrate and includes an array of first antenna elements. The second antenna panel is coupled on the substrate and includes an array of second antenna elements. The antenna isolator is coupled on the substrate and including a plurality of walls extending outwardly from the substrate along a length of the substrate between the first antenna panel and the second antenna panel. The antenna isolator reduces reduce wave propagation between the array of first antenna elements and the array of second antenna elements. The processing circuitry is coupled to the first antenna panel and configured to provide signals to the array of first antenna elements. The RX processing circuitry is coupled to the second antenna panel and configured to receive signals from the array of second antenna elements In a third embodiment, a method includes providing signals to a first antenna panel including an array of first antenna elements coupled to a substrate. The method also includes receiving signals from a second antenna panel including an array of second antenna elements coupled to the substrate. The method additionally includes reducing wave propagation between the array of first antenna elements and the array of second antenna elements using an antenna isolator coupled on the substrate, the antenna isolator comprising a plurality of walls extending outwardly from the substrate along a length of the substrate between the first antenna panel and the second antenna panel.

In a fourth embodiment, an apparatus can include a substrate, a first antenna panel, a second antenna panel and a wall isolator. The first antenna panel is coupled on the substrate and comprising an array of first antenna elements. The second antenna panel is coupled on the substrate comprising an array of second antenna elements. The wall isolator is coupled on the substrate. The wall isolator includes a first EBG element and a second EBG element. The first EBG element is positioned along an edge of the first antenna panel for a length of the substrate and configured to reduce surface wave propagation from the array of first antenna elements. The second EBG element is positioned along an edge of the second antenna panel for a length of the substrate and configured to reduce surface wave propagation from the array of second antenna elements.

In a fifth embodiment, an electronic device can include a massive MIMO panel, TX processing circuitry, and RX processing circuitry. The massive MIMO antenna can include a substrate, a first antenna panel, a second antenna panel and a wall isolator. The first antenna panel is coupled on the substrate and comprising an array of first antenna elements. The second antenna panel is coupled on the substrate comprising an array of second antenna elements. The wall isolator is coupled on the substrate. The wall isolator includes a first EBG element and a second EBG element. The first EBG element is positioned along an edge of the first antenna panel for a length of the substrate and configured to reduce surface wave propagation from the array of first antenna elements. The second EBG element is positioned along an edge of the second antenna panel for a length of the substrate and configured to reduce surface wave propagation from the array of second antenna elements. The TX processing circuitry is coupled to the first antenna panel and configured to control the array of first antenna elements. The RX processing circuitry is coupled to the second antenna panel and configured to control the array of second antenna elements.

In a sixth embodiment, a method of using an antenna is provided. The method includes providing signals to a first antenna panel including an array of first antenna elements coupled to a substrate. The method also includes receiving signals from a second antenna panel including an array of second antenna elements coupled to the substrate. The method further includes reducing surface wave propagation between the array of first antenna elements and the array of second antenna elements using an antenna isolator coupled on the substrate coupling a wall isolator on the substrate. The antenna isolator includes a first electromagnetic band-gap (EBG) element and a second EBG element. The first electromagnetic band-gap (EBG) element is positioned along an edge of the first antenna panel for a length of the substrate and configured to reduce surface wave propagation from the array of first antenna elements. The second EBG element positioned along an edge of the second antenna panel for a length of the substrate and configured to reduce surface wave propagation from the array of second antenna elements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
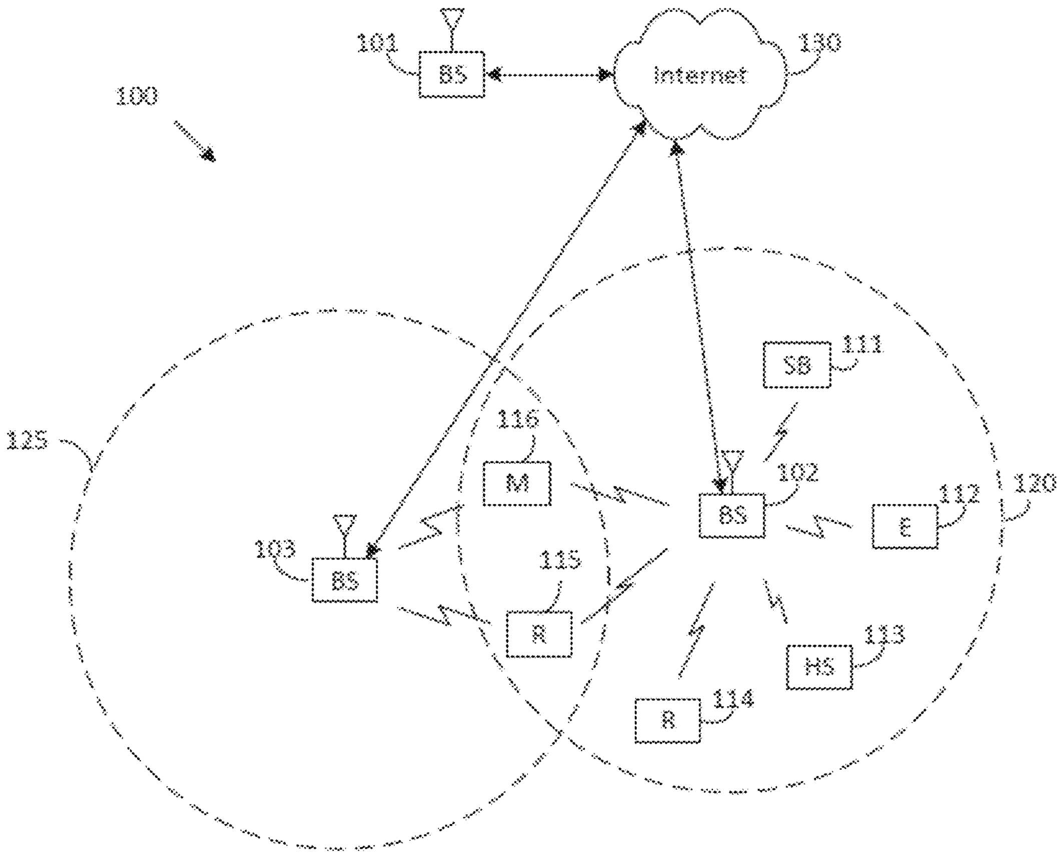
FIG. 1 illustrates a system of a network according to various embodiments of the present disclosure.

FIGS. 1 through 29, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of fourth generation (4G) communication systems and to enable various vertical applications, fifth generation (5G)/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, sixth generation (6G) or even later releases which may use terahertz (THz) bands.

5G enables setting up application services closer to the end user using edge computing architectures. When there is a need for relocation (e.g., when user moves to a different location, fault tolerance, etc.), the application services that were serving the user have to be relocated as well. This application covers the aspects of application service relocation for 5G multimedia edge services.

Cross-division duplex (XDD) is an advanced technique that makes full use of the advantages of both FDD and TDD. Specifically, XDD is capable of simultaneously handling UL and DL in the same contiguous band, maintaining FDD advantages in an unpaired TDD band. A portion of the DL is assigned to the UL, whereas the DL is transmitting adjacent channel power (ACP) in the UL band. Given a minimal guard band between the UL and the DL, adjacent channel leakage from the DL does not interfere with the intended received signal, resulting in self-interference. Furthermore, the duplexing poses self-interference (SI) issues because almost all transmission power of a base station can appear on the uplink receiver of the base station. Moreover, power amplifiers (PAs) in nearby high-power base stations operating in adjacent channels may cause significant interference from adjacent channel leakage.

Antenna isolation, an ability to prevent an undesired signal, is a critical specification of base stations, which can significantly impact system performance. For example, the low isolation results in 1) self-interference causing overflow or TX ACP in RX ULD band; 2) distortion or signal in the RX band due to nonlinearity of low noise amplifiers (LNA); and 3) signal-to-noise ratio (SNR) degradation, hence isolation enhancement techniques are required to reduce the interference. For a small antenna array, separating the TX and RX antenna panels and providing enhanced isolation between the TX and RX antenna panels is a candidate for reducing mutual coupling. However, accurate modeling and applying interference cancellation can be difficult in multiple-input multiple-output (MIMO) systems where base station may include many transmitters and receivers. The MIMO technology is one option to increase channel efficiency within the same spectrum. In addition, a massive MIMO configuration is utilized for fifth generation (5G) base stations to further improve the channel capacity by using a large number of antennas. With a larger antenna array configuration, a narrower beam is created, which can be spatial focused. Further, beamforming techniques are employed to provide an interference-free and high-capacity link to each user, thus increasing the spatial resolution without increasing inter-cell complexity. For a 5G massive MIMO based base station, maintaining high antenna isolation due to the close proximity of a large number of antennas poses several challenges. As it is critical for XDD-based 5G base stations to reduce interference, there is a necessity for a low-complexity solution that simultaneously can achieve high isolation for all antenna ports.

For a massive MIMO system operating in XDD mode, the transmitted propagation of each transmit (TX) antenna can interfere with each received signal at each received (RX) antenna. The commonly-used self-interference cancellation solutions of single-input single-output (SISO) systems are not suitable for multiple reasons. One reason is that mutual coupling can occur between the DL signal on a transmit antenna to all receive antennas receiving UL, thus all port-to-port isolation of an N-to-N system is supposed to improve simultaneously. A second reason is that Multiple transmitted signals can interfere with the RX antennas with arbitrary time or phase variations. A third reason is that one coupling between a TX antenna and an RX antenna has a unique frequency response dependent on the location of the two antennas with respect to each other as well as within the antenna panel. A fourth reason can is that a dual-polarized antenna design is required, which means all co-polarizations and cross-polarizations satisfy the isolation requirements. A fifth reason is that other sources also degrade isolation performance, such as complicated feeding networks, radiation distortions of feeding vias, and the environment.

This disclosure targets reducing radiated direct-path and diffracted propagation, which may result in cancellation of channel-interference in massive MIMO systems. For a 5G massive MIMO based base station, it is quite challenging to maintain high antenna isolation given the close proximity of a large number of antennas. Therefore, a design of an antenna isolator to simultaneously achieve high isolation for all antenna ports, is a necessity to improve the system performance of a 5G base station.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term “base station” or “BS” can refer to any component (or collection of components) configured to provide wireless access to a network, such as transmit point (TP), transmit-receive point (TRP), an enhanced base station (eNodeB or gNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms “BS” and “TRP” are used interchangeably in the present disclosure to refer to network infrastructure components that provide wireless access to remote terminals. Also, depending on the network type, the term “user equipment” or “UE” can refer to any component such as “mobile station,” “subscriber station,” “remote terminal,” “wireless terminal,” “receive point,” or “user device.” For the sake of convenience, the terms “user equipment” and “UE” are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
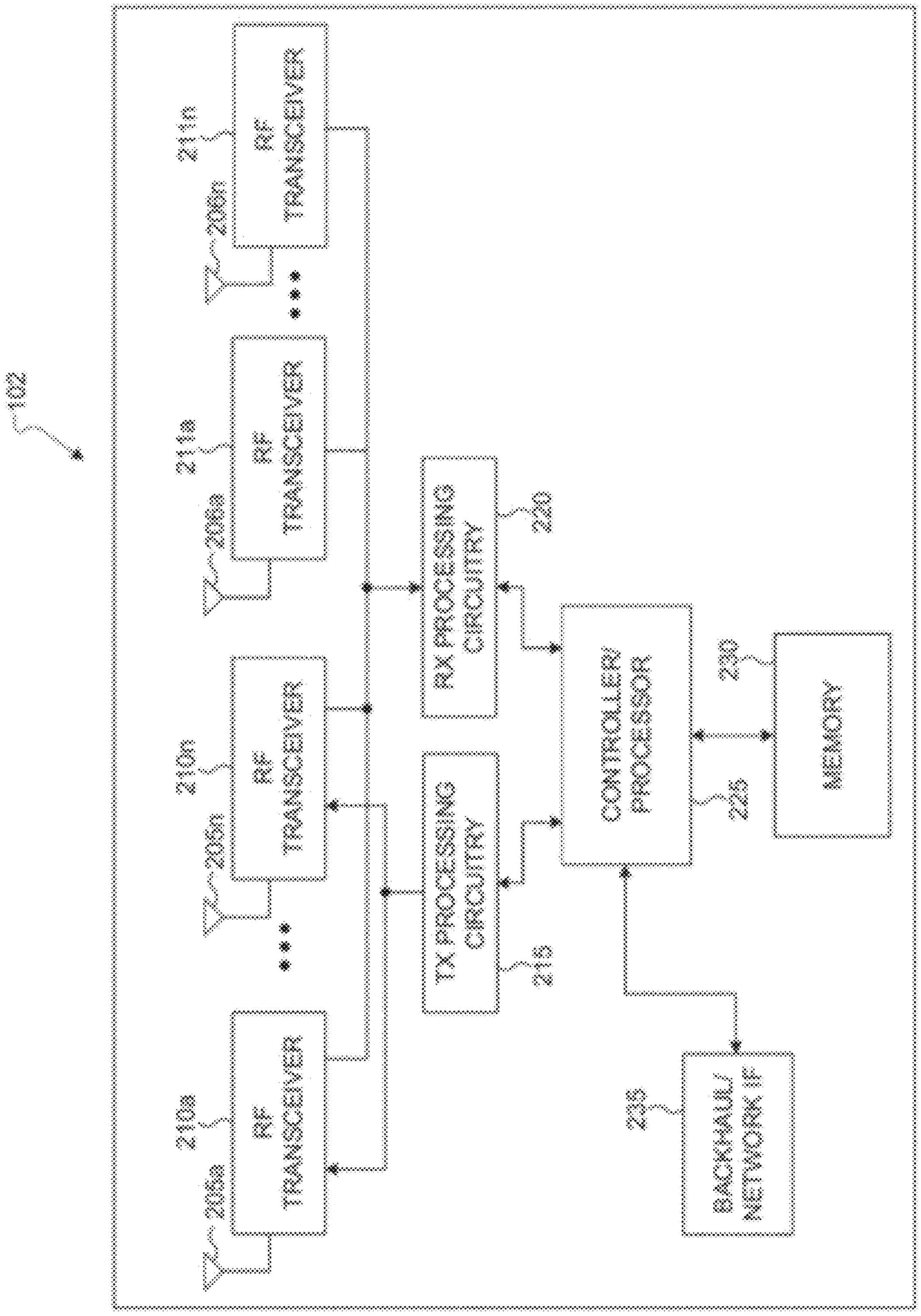
FIG. 2 illustrates a base station according to various embodiments of the present disclosure.

FIG. 2 illustrates an example BS 102 according to embodiments of the present disclosure. The embodiment of the BS 102 illustrated in FIG. 2 is for illustration only, and the BS 102 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas **205*a*-205*n* and 206*a*-206*n*, multiple RF transceivers 210*a*-210*n* and 211*a*-211*n*, transmit (TX) processing circuitry 215, and receive (RX) processing circuitry 220. The BS 102 also includes a controller/processor 225, a memory 230, and a backhaul or network interface 235**.

The multiple antennas **205*a*-205*n* and 206*a*-206*n* comprise the XDD massive MIMO antenna array. In some embodiments, the multiple antennas 205*a*-205*n* comprise an array of common TX and RX antennas for massive MIMO operation, and the multiple antennas 206*a*-206*n*** comprise dedicated RX antennas for UL RX operation.

The common TX and RX antennas **205*a*-205*n* can perform both DL TX operations and UL RX operations during TDD mode and can perform DL TX operations during XDD mode. The dedicated RX antennas 206*a*-206*n* can perform UL RX operations only during XDD mode, or they can perform UL RX operations during both XDD mode and TDD mode. In the latter case, both the common TX and RX antennas 205*a*-205*n* and the dedicated RX antennas 206*a*-206*n*** perform the UL RX operations during TDD mode.

The RF transceivers **210*a*-210*n* receive, from the antennas 205*a*-205*n* during TDD mode, incoming RF signals, such as signals transmitted by UE 104 or other UEs in the wireless network 100. Likewise, the RF transceivers 211*a*-211*n* receive, from the antennas 206*a*-206*n* during XDD mode or TDD mode, such incoming RF signals. The RF transceivers 210*a*-210*n* and 211*a*-211*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225** for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. During both TDD mode and XDD mode, the RF transceivers **210*a*-210*n* receive the outgoing processed baseband or IF signals from the TX processing circuitry 215 and up-convert the baseband or IF signals to outgoing RF signals that are transmitted via the antennas 205*a*-205*n***.

The controller/processor 225 can include one or more processors or other processing devices that control the overall operation of the BS 102. For example, the controller/processor 225 could control the reception of forward channel signals and the transmission of reverse channel signals by the RF transceivers **210*a*-210*n*, the RX processing circuitry 220, and the TX processing circuitry 215 in accordance with well-known principles. The controller/processor 225** can perform interference cancelation processes to isolate the incoming RF signals from the outgoing RF signals in XDD mode. In some embodiments, the interference cancelation processes are self-interference cancelation (SIC) processes.

In some embodiments, the RF transceivers **210*a*-210*n* or the RX processing circuitry 220** perform this interference cancelation process. The interference cancelation process can be implemented using dedicated hardware, such as an application-specific integrated circuit (ASIC) or a field-programmable gate array (FPGA). The ASIC can be a radio frequency ASIC (RF ASIC).

The controller/processor 225 could support additional functions as well, such as more advanced wireless communication functions. For instance, the controller/processor 225 could support beamforming or directional routing operations in which outgoing signals from multiple antennas 205*a*-205*n* are weighted differently to effectively steer the outgoing signals in a desired direction. Any of a wide variety of other functions could be supported in the BS 102 by the controller/processor 225.

The controller/processor 225 is also capable of executing programs and other processes resident in the memory 230, such as an operating system (OS). The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting 5G, LTE, or LTE-A), the interface 235 could allow the BS 102 to communicate with other BSs over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a random-access memory (RAM), and another part of the memory 230 could include a Flash memory or other read-only memory (ROM).

Although FIG. 2 illustrates one example of a BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

Figure 3:
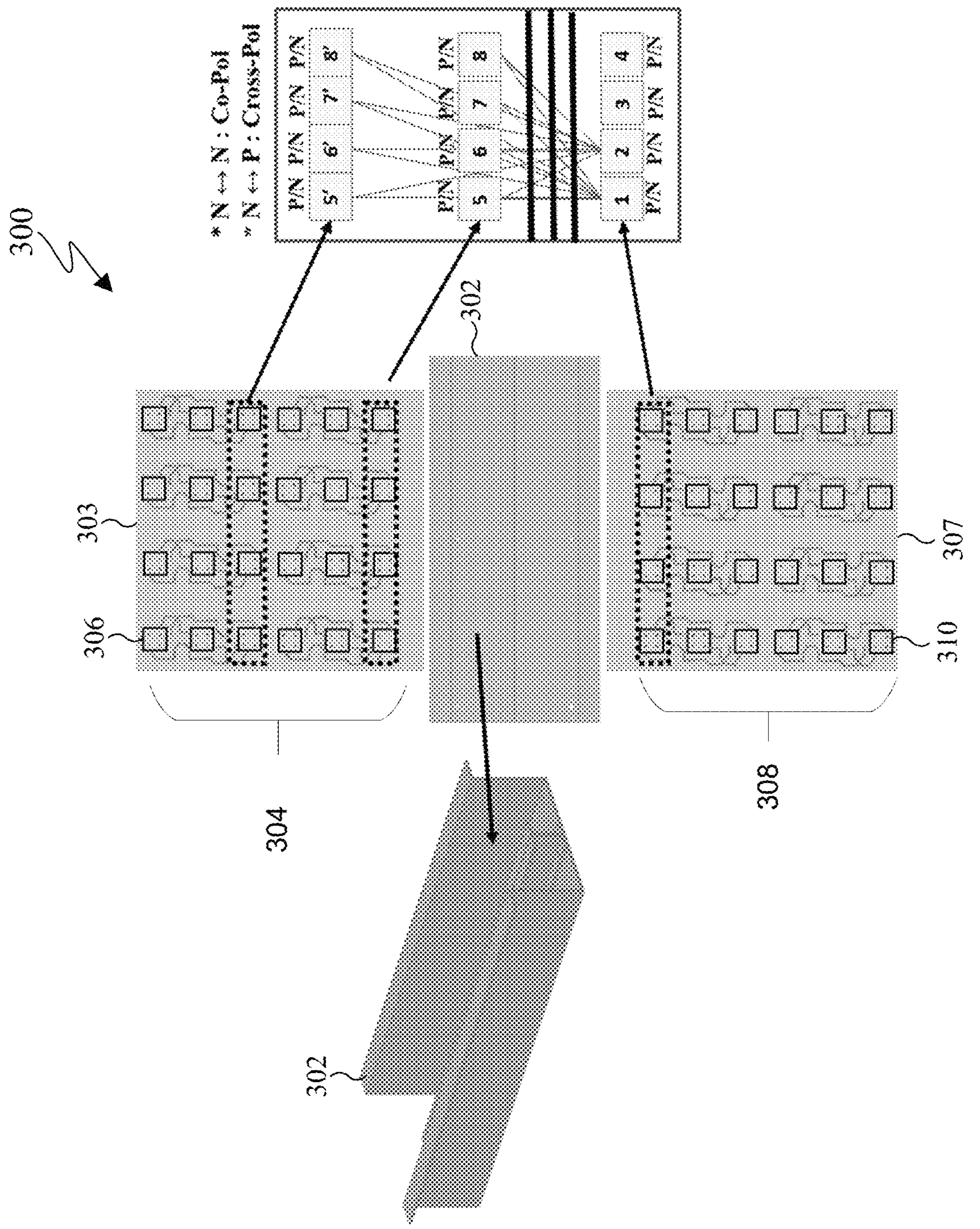
FIG. 3 illustrates a dual-polarized MIMO system with an antenna isolator in accordance with this disclosure.

FIG. 3 illustrates a dual-polarized MIMO system 300 with an antenna isolator 302 in accordance with this disclosure. The embodiment of the dual-polarized MIMO system 300 illustrated in FIG. 3 is for illustration only. FIG. 3 does not limit the scope of this disclosure to any particular implementation of a dual-polarized MIMO system.

As shown in FIG. 3, the dual-polarized MIMO system 300 includes a first antenna array 304 of TX antennas 306, such as antennas 205*a*-205*n* of FIG. 2, and a second antenna array 308 of RX antennas 310, such as antennas 206*a*-206*n* of FIG. 2. It is understood that, while illustrated as a first antenna array 304 is positioned adjacent to a second antenna array 308, a similar arrangement can be created wherein the first antenna array 304 of TX antennas 306 can be additionally or alternatively placed below or to the left or right of the second antenna array 308 of RX antennas 310 illustrated in FIG. 3.

The dual-polarized MIMO system 300 can include an electromagnetic (EM) antenna isolator 302, multiple TX antennas 306, and multiple RX antennas 310. The first antenna array 304 of TX antennas 306 can be formed of TX/RX antennas 205*a*-205*n* for massive MIMO operation. During TDD mode, the TX antennas 306 can perform both DL TX and UL RX operations in different time slots. During XDD mode, the TX antennas 306 can only perform DL TX operations.

The RX antennas 310 can perform UL RX operations during XDD mode. In some embodiments, the RX antennas 310 may not operate during TDD mode, while in other embodiments, the RX antennas 310 can perform UL RX operations during TDD mode alongside the TX antennas 306. During XDD mode, the UL RX operations can be performed by the RX antennas 310 in the same time slots in which the TX antennas 306 can perform DL TX operations.

The antenna isolator 302 can provide isolation between the first antenna array 304 of TX antennas 306 and the second antenna array 308 of RX antennas 310. This at least partially protects the RX antennas 310 from TX leakage from the TX antennas 306 during XDD mode. By optimizing the wall parameters of the antenna isolator 302, a phase path difference can be tuned to produce a destructive mode of wave propagation. The result, via the designed wall, is a reduction of propagation waves including direct path, horizontal diffraction, and vertical diffraction, resulting in significant improvement of antenna isolation.

Although FIG. 3 illustrates a dual-polarized MIMO system 300 with an antenna isolator 302, various changes may be made to FIG. 3. For example, the sizes, shapes, and dimensions of the dual-polarized MIMO system 300 and its individual components can vary as needed or desired. Also, the number and placement of various components of the dual-polarized MIMO system 300 can vary as needed or desired. In addition, the dual-polarized MIMO system 300 may be used in any other suitable transmit-receive isolation enhancement process for a dual-polarized MIMO antenna array and is not limited to the specific processes described above.

Figure 4:
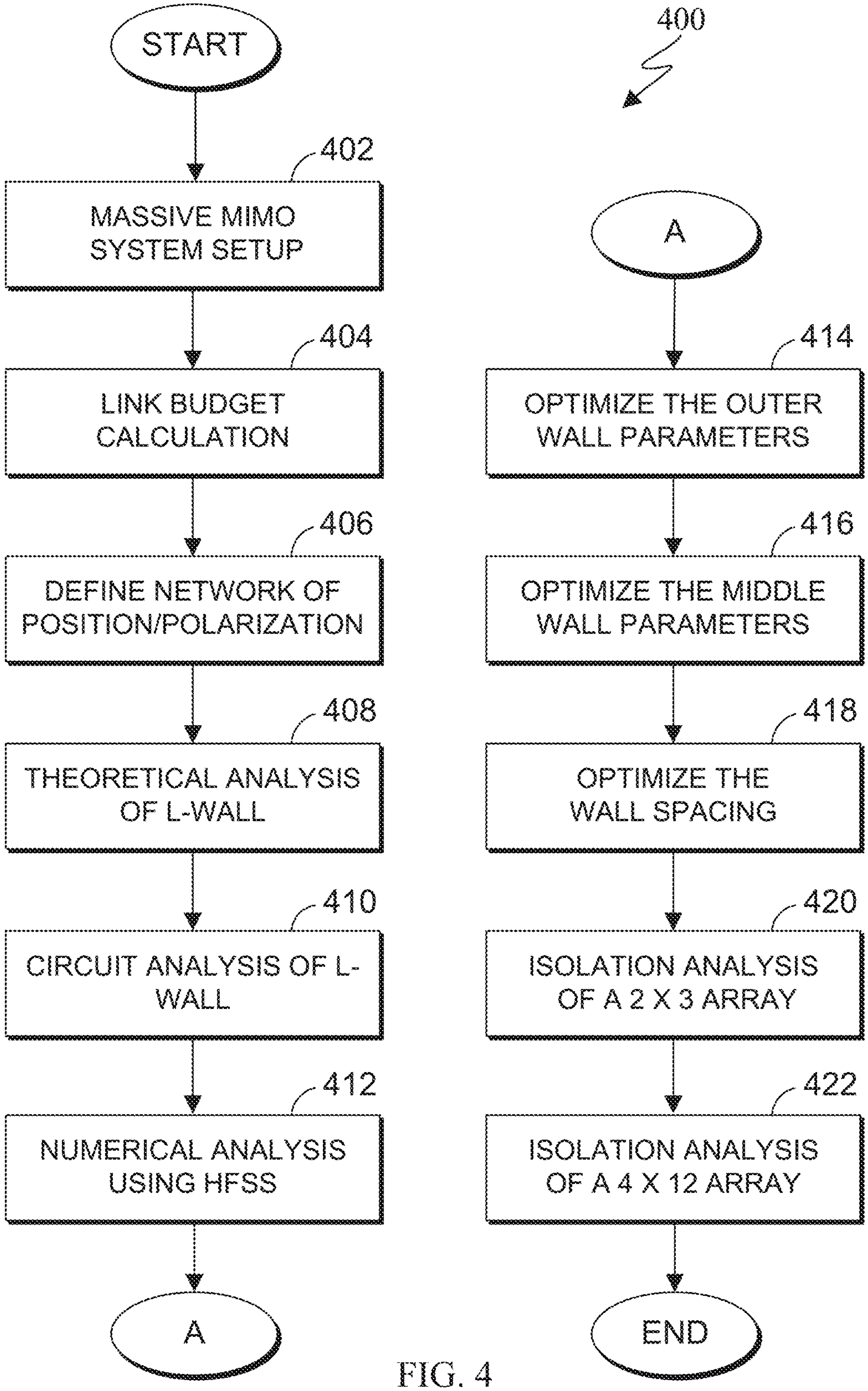
FIG. 4 illustrates an example method for design of a dual-polarized MIMO antenna array with transmit-receive isolation enhancement according to this disclosure.

FIG. 4 illustrates an example method 400 for design of a dual-polarized MIMO system 300 with transmit-receive isolation enhancement according to this disclosure. However, the method 400 may be used with any other suitable system and any other suitable dual-polarized MIMO system.

As shown in FIG. 4, the MIMO system 300 can be setup at step 402. The setup can include determining an amount of TX antennas 306 in the first antenna array 304 and RX antennas 310 in the second antenna array 308. For example, the MIMO system 300 shown in FIG. 3 is modeled with sixteen TX antennas 306 and sixteen RX antennas 310.

A link budget calculation is performed for the MIMO system 300 at step 404. The link budget is dependent on a distance to target and frequencies and gains of the antennas. The link budget accounts for all of the gains and losses from the transmitter at BS 102 through a transmission medium to the target receiver or UE 104, 111-116.

The antenna element positioning, and polarization is defined for the MIMO system 300 at step 406. The positions of the antenna elements and polarization is important for transmitting and receiving signals. Each antenna element can be logically mapped onto a single antenna port. In general, one antenna port can correspond to multiple antenna elements. The vertical dimension (consisting of six rows) facilitates elevation beamforming in addition to the azimuthal beamforming across the horizontal dimension (consisting of four columns of dual polarized antennas).

Figure 5:
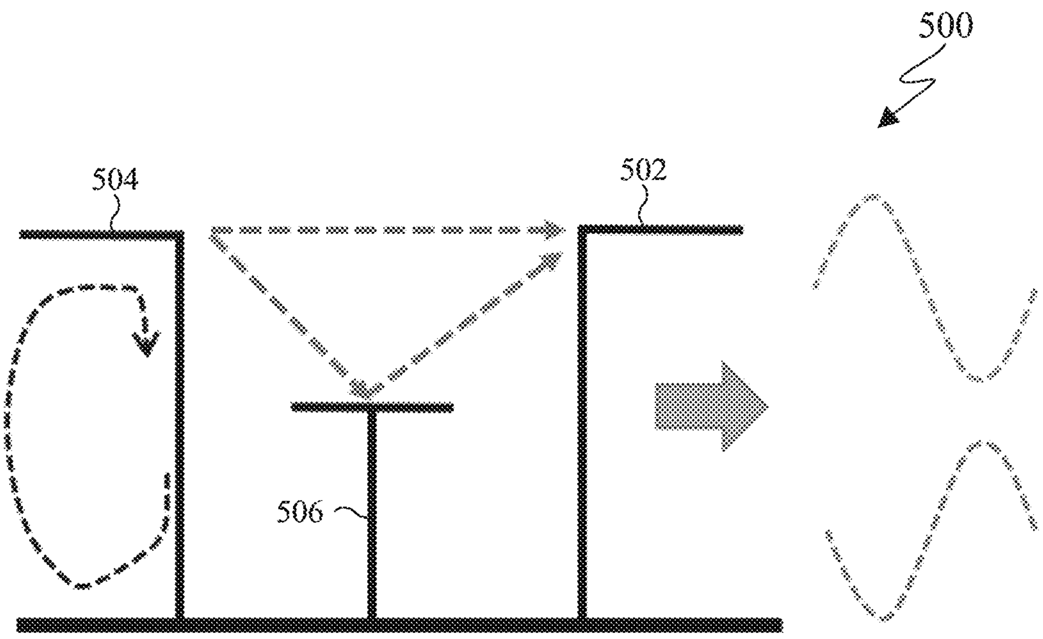
FIG. 5 illustrates an example theoretical analysis of the antenna isolator in accordance with this disclosure.

A theoretical analysis of L-walls can be performed for the antenna isolator 302 at step 408. FIG. 5 illustrates an example theoretical analysis 500 of the antenna isolator 302 in accordance with this disclosure. The embodiment of the theoretical analysis 500 illustrated in FIG. 5 is for illustration only. FIG. 5 does not limit the scope of this disclosure to any particular implementation of a dual-polarized MIMO system.

As shown in FIG. 5, the theoretical analysis 500 can be used to design the antenna isolator 302 to reduce direct path propagation as well as vertical and horizontal diffraction.

As one of geometrical techniques, a typical wall isolator is capable of suppressing direct path propagation, however, the diffraction wave modes produce more undesirable mutual coupling. FIG. 5 presents the principles of the designed antenna isolator 302. As shown in FIG. 5, the triple-wall configuration can reflect direct and diffracted propagation. By optimizing the vertical height, the phase path difference of direct path and diffracted is tuned to a half-wavelength, thus creating an out-of-phase destructive mode with wave cancellation. Specifically, two L-shaped outer walls (first L-shaped wall 502 and second L-shaped wall 504 can reduce directed path and vertical diffraction, whereas the middle T-shaped wall 506 can be designed to cancel horizontal diffraction.

Although FIG. 5 illustrates a theoretical analysis 500 of the antenna isolator 302, various changes may be made to FIG. 5. For example, the number and placement of various components of the theoretical analysis 500 can vary as needed or desired. In addition, the theoretical analysis 500 may be used in any other suitable transmit-receive isolation enhancement for dual-polarized massive MIMO antenna array and is not limited to the specific processes described above.

Figure 6:
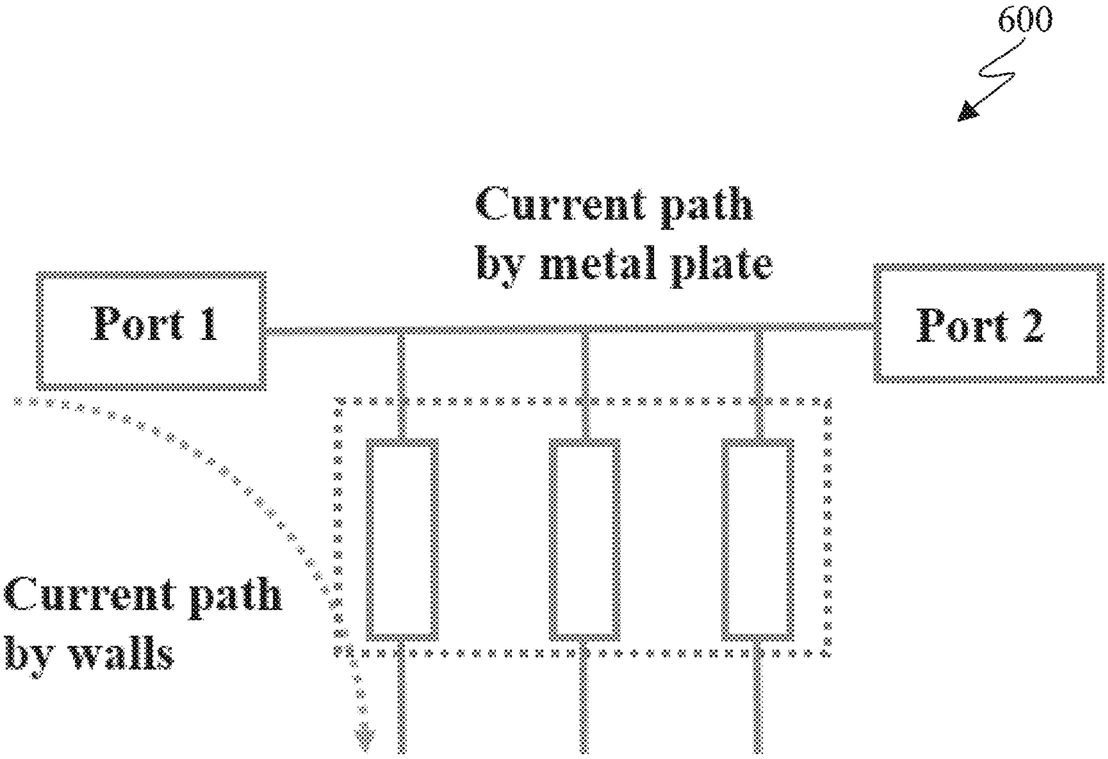
FIG. 6 illustrates a circuit analysis of the antenna isolator in accordance with this disclosure.

A circuit analysis of L-walls can be performed for the antenna isolator 302 at step 410. FIG. 6 illustrates a circuit analysis 600 of the antenna isolator 302 in accordance with this disclosure. The embodiment of the circuit analysis 600 illustrated in FIG. 6 is for illustration only. FIG. 6 does not limit the scope of this disclosure to any particular implementation of a dual-polarized massive MIMO system.

As shown in FIG. 6, a representative circuit is provided for the antenna isolator 302. Based on theoretical analysis 500, a total length of vertical component and horizontal component of L-shape outer walls 502 is $\lambda/4$. The surface current can be reduced due to the shorting termination; thus the total length of L-shape outer wall components is confined as $\lambda/4$. The input impedance of middle-wall port is designed as open termination with the transmission line of $\lambda/4$. As a consequence, the surface current is guided via outer wall path, resulting in low transmission between input and output. As more wall elements are added, these additional walls can be considered as tuning elements of resonance.

Although FIG. 6 illustrates a circuit analysis 600 of the antenna isolator 302, various changes may be made to FIG. 6. For example, the sizes, shapes, and dimensions of the circuit analysis 600 and its individual components can vary as needed or desired. Also, the number and placement of various components of the circuit analysis 600 can vary as needed or desired. In addition, the circuit analysis 600 may be used in any other suitable transmit-receive isolation enhancement for a dual-polarized massive MIMO antenna array and is not limited to the specific processes described above.

As shown in FIG. 4, a numerical analysis using a high-frequency structure simulator (HFSS) can be performed on the MIMO system 300 at step 412. The HFSS is software for design and simulating high-speed, high-frequency electronics taking factors into consideration that may be too complex for a theoretical analysis, such as material properties. Dimensions such as the size of the walls and spacing between the walls can be optimized using the numerical analysis.

The outer wall parameters can by optimized for the MIMO system 300 in step 414. The middle wall parameters can be optimized for the MIMO system 300 in step 416. The wall spacing can be optimized for the MIMO system 300 in step 418. As previous discussions are based on assumptions of ideal environment without considerations of specific array configurations, numerical methods are used to analyze electromagnetic fields of each port-to-port coupling. The theoretical values can be used as a starting point. Next, numerical methods are used to optimize the parameters, such as using Ansys HFSS simulator. Further, a height of side walls/middle walls and spacing between walls can be optimized.

Figure 7:
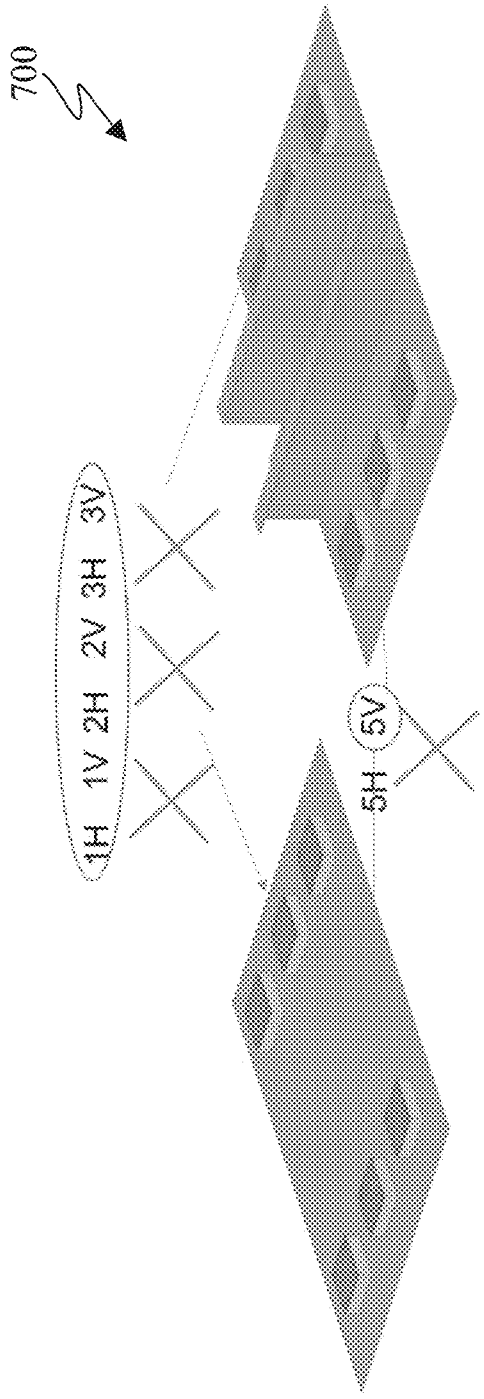
FIGS. 7 and 8 illustrate an example isolation analysis including a verification and port-to-port coupling analysis of the antenna isolator in accordance with this disclosure.
Figure 8:
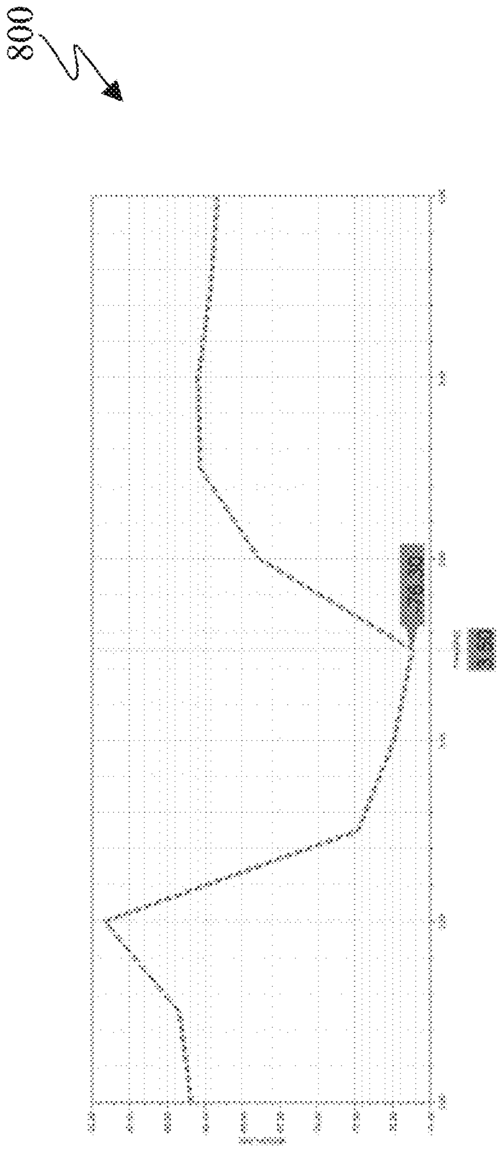

An isolation analysis of a 2×3 array can be performed for the MIMO system 300 in step 420. FIGS. 7 and 8 illustrate an example isolation analysis including a verification 700 and port-to-port coupling analysis 800 of the antenna isolator 302 in accordance with this disclosure. In particular, FIG. 7 illustrates an example verification 700 of the antenna isolator 302 and FIG. 8 illustrates an example port-to-port coupling analysis 800 of the antenna isolator 302. The embodiments of the verification 700 illustrated in FIG. 7 and the port-to-port coupling analysis 800 illustrated in FIG. 8 for the isolation analysis are for illustration only. FIGS. 7 and 8 do not limit the scope of this disclosure to any particular implementation of a dual-polarized massive MIMO system.

As shown in FIG. 7, a first verification is a dual-polarized 2×3 array (shown in FIG. 5). The antenna element spacing is $0.75\lambda$ and panel-to-panel spacing is $2.5\lambda$. The mutual coupling, between a TX antenna and an RX antenna, has a unique frequency response, dependent on the location of the two antennas as well as within the antenna panel. The wall related parameters are optimized to increase antenna isolation at 3.5 GHz.

As shown in FIG. 8, two cases are simulated: (1) antenna array with existing technique; (2) antenna array with designed isolator. The element 5 is used as observation port with 6 port-to-port couplings including 1H-5V, 1V-5V, 2H-5V, 2V-5V, 3H-5V and 3V-5V. Based on simulation results of Table 1, the average isolation enhancement is 17.7 dB. Moreover, the worst isolation level increases from 40.74 dB to 55.84 dB with 15 dB improvement.

TABLE 1

Comparison of antenna isolation of a 2 × 3 array with existing technique/designed isolator

| Polarization | Isolation with existing technique (dB) | Isolation with designed isolator (dB) |
|---|---|---|
| 1H to 5V | 46.22 | 61.20 |
| 1V to 5V | 52.75 | 69.97 |
| 2H to 5V | 46.02 | 55.84 |
| 2V to 5V | 41.75 | 62.52 |

TABLE 1-continued

| Comparison of antenna isolation of a 2 × 3 array with existing technique/designed isolator | | |
|---|---|---|
| Polarization | Isolation with existing technique (dB) | Isolation with designed isolator (dB) |
| 3H to 5V | 45.07 | 70.00 |
| 3V to 5V | 40.74 | 59.32 |

Although FIGS. 7 and 8 illustrate an example isolation analysis including a verification 700 and port-to-port coupling analysis 800 of the antenna isolator 302, various changes may be made to FIGS. 7 and 8. For example, the sizes, shapes, and dimensions of the verification 700 illustrated in FIG. 7 and the port-to-port coupling analysis 800 illustrated in FIG. 8 for the isolation analysis and their individual components can vary as needed or desired. Also, the number and placement of various components of the verification 700 illustrated in FIG. 7 and the port-to-port coupling analysis 800 illustrated in FIG. 8 for the isolation analysis can vary as needed or desired. In addition, the verification 700 illustrated in FIG. 7 and the port-to-port coupling analysis 800 illustrated in FIG. 8 for the isolation analysis may be used in any other suitable transmit-receive isolation enhancement for dual-polarized massive MIMO antenna array and is not limited to the specific processes described above.

As shown in FIG. 4, an isolation analysis of a 4×12 array can be performed for the MIMO system 300 in step 422. A second verification is a dual-polarized 12×4 massive MIMO antenna array. The antenna elements 1 and 2 are used for observation port, and dual polarization of 8 different ports are studied. Two cases are simulated: (A) antenna array with common ground; (B) antenna array with existing technique. Table 2 presents the co-polarization and cross-polarization results of port 1 and 2. Obviously, the minimum isolation increases from 50.6 dB to 65.1 dB with the designed antenna isolator. Therefore, regardless of a specific size of the massive MIMO systems, a designed antenna isolator significantly improves the antenna isolation.

TABLE 2

Comparison of antenna coupling of a 12 × 4 array with existing technique/designed isolator

| | N1 | | | | | | | | N2 | | | | | | | |
|---|---|---|---|---|---|---|---|---|---|---|---|---|---|---|---|---|
| | N5 | N6 | N7 | N8 | P5 | P6 | P7 | P8 | N5 | N6 | N7 | N8 | P5 | P6 | P7 | P8 |
| A | −58.5 | −61.5 | −66.2 | −66.3 | −50.6 | −56.1 | −64.1 | −69.7 | −59.2 | −55.9 | −55.7 | −61.8 | −59.5 | −55.1 | −57.3 | −62.4 |
| B | −68.2 | −67.5 | −65.8 | −74.8 | −69.5 | −79.2 | −73.2 | −65.9 | −68.3 | −65.8 | −66.8 | −65.1 | −69.9 | −71.9 | −74.5 | −68.9 |
| | N1 | | | | | | | | N2 | | | | | | | |
| | N5' | N6' | N7' | N8' | P5' | P6' | P7' | P8' | N5' | N6' | N7' | N8' | P5' | P6' | P7' | P8' |
| A | −64.7 | −68.4 | −73.3 | −96.0 | −60.7 | −71.8 | −75.1 | −78.0 | −76.9 | −74.9 | −79.7 | −70.3 | −67.9 | −75.4 | −75.3 | −78.7 |
| B | −78.5 | −71.3 | −87.1 | −68.3 | −66.3 | −71.8 | −66.9 | −70.8 | −77.1 | −80.8 | −76.8 | −87.1 | −77.2 | −80.9 | −76.1 | −76.2 |

Although FIG. 4 illustrates one example method 400 for design of a dual-polarized MIMO system 300 with transmit-receive isolation enhancement, various changes may be made to FIG. 4. For example, while shown as a series of steps, various steps in FIG. 4 may overlap, occur in parallel, or occur any number of times.

Figure 9:
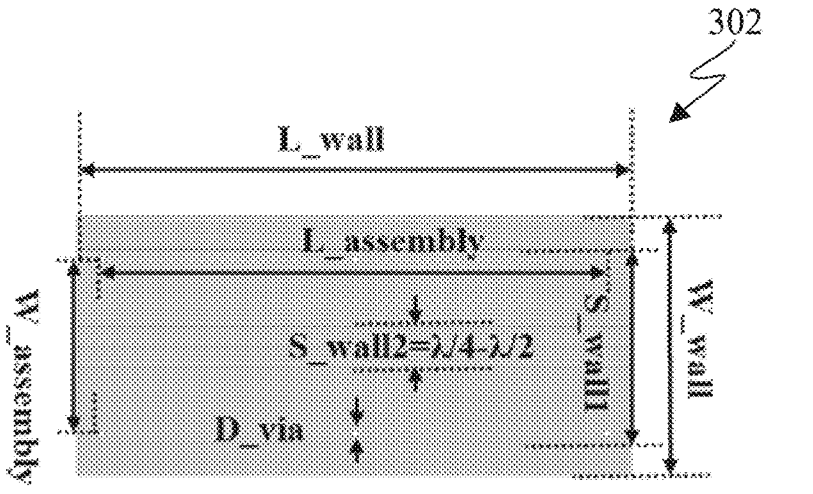
FIGS. 9 through 11 illustrate an example antenna isolator in accordance with this disclosure.
Figure 10:
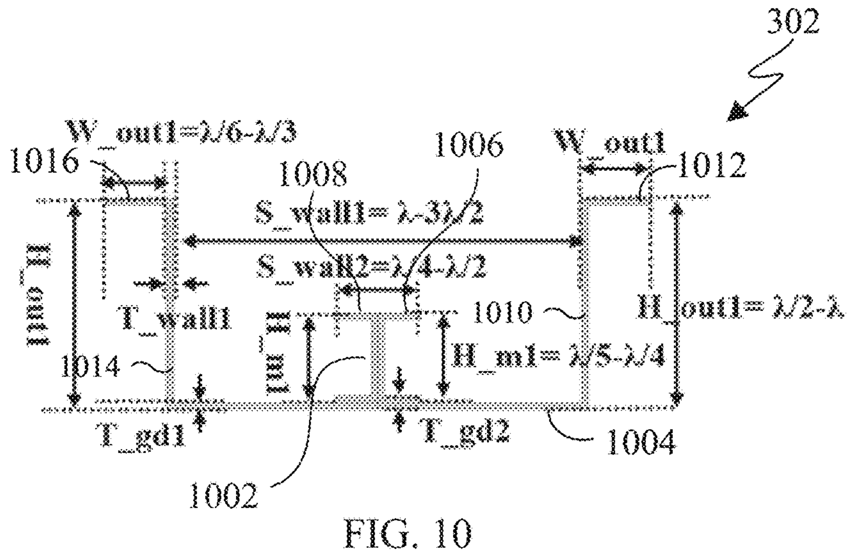
Figure 11:
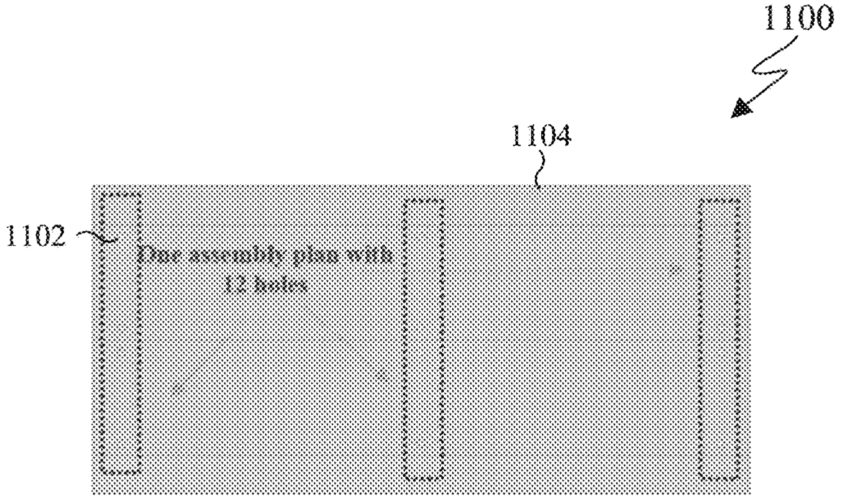

FIGS. 9 through 11 illustrate an example antenna isolator 302 in accordance with this disclosure. In particular, FIG. 9 illustrates a top view of an example antenna isolator 302, FIG. 10 illustrates a side view of an example antenna isolator 302, and FIG. 11 illustrates an assembly plan 1100 for an antenna isolator 302. The embodiments of the example antenna isolator 302 illustrated in FIGS. 9 through 11 are for illustration only. FIGS. 9 through 11 do not limit the scope of this disclosure to any particular implementation of a dual-polarized massive MIMO system.

As shown in FIGS. 9 and 10, example dimensions are provided for optimized parameters of a designed wall structure for an antenna isolator 302, which can be optimized for different frequency bands. By taking fabrication restraints into considerations, the middle T-shaped walls 502, 504 are designed with two C-shaped components. The outer L-shaped walls 502, 504 are fabricated with the common ground together, which provides stable mechanical support for two C-shape walls.

The plurality of walls of the antenna isolator can include a T-shaped wall 506 between at least two L-shaped walls 502, 504. The T-shaped wall 506 can be configured to reduce horizontal diffraction. The T-shaped wall 506 can include a first wall 1002 that extends outwardly from the substrate 1004 along the length of the substrate 1004. The height of the first wall can be defined by $\lambda/5$-$\lambda/4$. The T-shaped wall can include a second wall 1006 that extends in a first direction from a second end of the first wall 1002 that is opposite to a first end of the first wall 1002 adjacent to the substrate 1004. A length of the second wall 1006 can be defined by $\lambda/8$-$\lambda/4$. The T-shaped wall 506 can include a third wall 1008 that extends in a second direction opposite to the first direction from the second end of the second wall 1006. A length of the third wall 1008 can be defined by $\lambda/8$-$\lambda/4$. A length of the combined second wall 1006 and the third wall 1008 can be defined by A length of the second wall 1006 can be defined by $\lambda/4$-$\lambda/2$.

The antenna isolator 302 can also include a first L-shaped wall 502 that can be positioned between the T-shaped wall 506 and the first antenna panel. The first L-shaped wall 502 can reduce directed path and vertical diffraction from the array of first antenna elements. A distance between a center of the antenna isolator 302 and the first L-shaped wall 502 can be defined by $\lambda/2$-$3\lambda/4$. The first L-shaped wall 502 can include a first wall 1010 that extends outwardly from the substrate 1004 along the length of the substrate 1004. A height of the first wall 1010 can be defined by $\lambda/2$-$\lambda$. The first L-shaped wall 502 can include a second wall 1012 that extends at a second end of the first wall 1010 that is opposite to a first end of the first wall 1010 adjacent to the substrate 1004 in the first direction towards the first antenna panel. A length of the second wall 1012 can be defined by $\lambda/6$-$\lambda/3$.

The antenna isolator 302 can also include a second L-shaped wall 504 that can be positioned between the T-shaped wall 506 and the second antenna panel. A distance between a center of the antenna isolator 302 and the second L-shaped wall 504 can be defined by λ/2-3λ/4. A distance between the first L-shaped wall 502 and the second L-shaped wall 504 can be defined by λ-3λ/2. The second L-shaped wall 504 can include a first wall 1014 that extends outwardly from the substrate 1004 along the length of the substrate 1004. A height of the first wall 1014 can be defined by λ2-λ. The second L-shaped wall 504 can include a second wall 1016 that extends at a second end of the first wall 1014 that is opposite to a first end of the first wall 1014 adjacent to the substrate 1004 in the first direction towards the second antenna panel. A length of the second wall 1012 can be defined by λ/6-λ/3.

Lengths of extensions from the substrate of first and second walls of the first L-shaped wall can be selected as a function of a resonance frequency of the first antenna panel to reduce diffraction from the first antennal panel. Lengths of extensions from the substrate of first and second walls of the second L-shaped wall can be selected as a function of a resonance frequency of the second antenna panel to reduce diffraction from the second antennal panel. A distance between the first and second L-shaped walls is selected as a function of a resonance frequency of the first antenna panel to reduce a port-to-port coupling.

As shown in FIG. 11, an assembly layout 1100 is provided with twelve holes 1102 to indicate twelve plastic screws are used to fix the designed antenna isolator to the panel ground 1104. Each wall of the antenna isolator 302 can be coupled to the ground through four holes, although any number of holes may be used to attach the respective walls of the antenna isolator 302.

Although FIGS. 9 through 11 illustrate an example antenna isolator 302 and assembly layout 1100, various changes may be made to FIGS. 9 through 11. For example, the sizes, shapes, and dimensions of the example antenna isolator 302 and its individual components can vary as needed or desired. Also, the number and placement of various components of the example antenna isolator 302 can vary as needed or desired. In addition, the example antenna isolator 302 may be used in any other suitable transmit-receive isolation enhancement for dual-polarized massive MIMO antenna array and is not limited to the specific processes described above.

Figure 12:
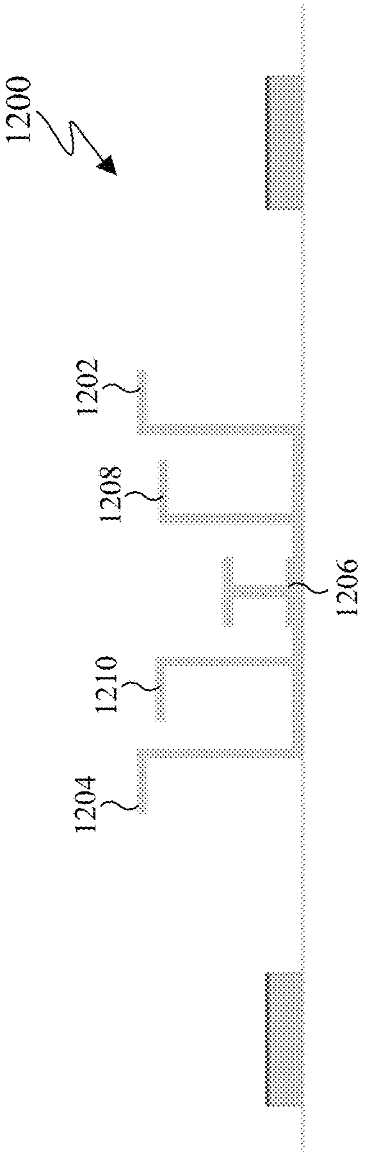
FIG. 12 illustrates an example antenna isolator in accordance with this disclosure.
Figure 13:
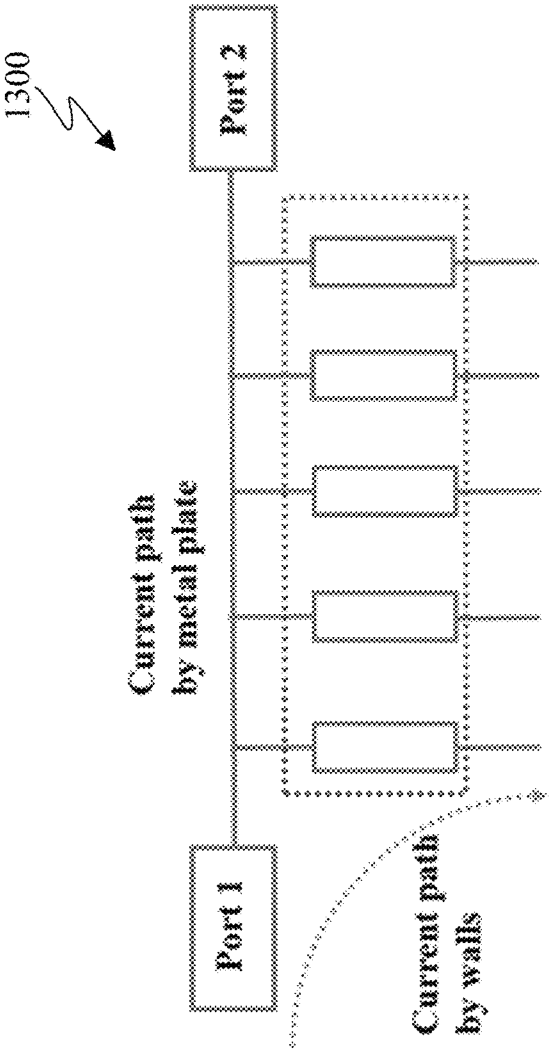
FIG. 13 illustrates an example circuit model for antenna isolator in accordance with this disclosure.

FIGS. 12 and 13 illustrate an example antenna isolator 1200 in accordance with this disclosure. In particular, FIG. 12 illustrates an example antenna isolator 1200 with five walls and FIG. 13 illustrates a circuit analysis 1300 of the antenna isolator 1200. The embodiments of the antenna isolator 1200 illustrated in FIG. 12 and the circuit analysis 1300 illustrated in FIG. 13 are for illustration only. FIGS. 12 and 13 do not limit the scope of this disclosure to any particular implementation of a dual-polarized massive MIMO system.

As shown in FIGS. 12 and 13, the antenna isolator 1200 can include five walls. Although a designed solution works at sub-6 GHz (3.4 GHz to 3.6 GHz) operation band, as wall parameters are determined by the wavelength at a given frequency, this antenna isolator can be also applied to higher frequencies such as mmWave bands. Therefore, this isolation component can be a candidate of 5G or 6G base station antenna isolators with several possible modifications.

A first possible modification can include adjusting the horizontal and vertical component of walls based on higher frequency. As the phase difference is produced based on a quarter of wavelength at a given frequency, the low-profile wall configuration can be designed at mmWave bands due to their higher frequencies.

A second possible modification can include extending a length of walls to reduce horizontal diffraction wave due to edge of antenna array. A third possible modification can include adjusting wall-to-wall spacing to tune the port-to-port coupling at a given frequency. A fourth possible modification can include increasing a number of walls, such as 5-wall or 7-wall, which may tune the resonance frequency with additional terminations. While four possible modifications described, other modifications and combinations of modifications are within the scope of this disclosure.

FIG. 12 presents a five-wall isolator 1200 with a larger element spacing between antenna panels. Similar to 3-wall configuration, based on the equivalent circuit analysis, additional walls tune resonance frequency as shown in FIG. 13. The design procedures are similar to a designed isolator. First, the initial parameters are based on theoretical calculations. Next, the equivalent circuit analysis is utilized to tune the resonance frequency by optimizing the parameters. Numerical approaches are used to optimize parameters such as outer wall/middle wall/wall spacing.

Although FIGS. 12 and 13 illustrate an example antenna isolator 1200 and circuit analysis 1300 of antenna isolator 1200, various changes may be made to FIGS. 12 and 13. For example, the number and placement of various components of the antenna isolator 1200 illustrated in FIG. 12 and the circuit analysis 1300 of the antenna isolator 1200 illustrated in FIG. 13 can vary as needed or desired. In addition, the antenna isolator 1200 illustrated in FIG. 12 and the circuit analysis 1300 of the antenna isolator 1200 illustrated in FIG. 13 may be used in any other suitable transmit-receive isolation enhancement for dual-polarized massive MIMO antenna array and is not limited to the specific processes described above.

Figure 14:
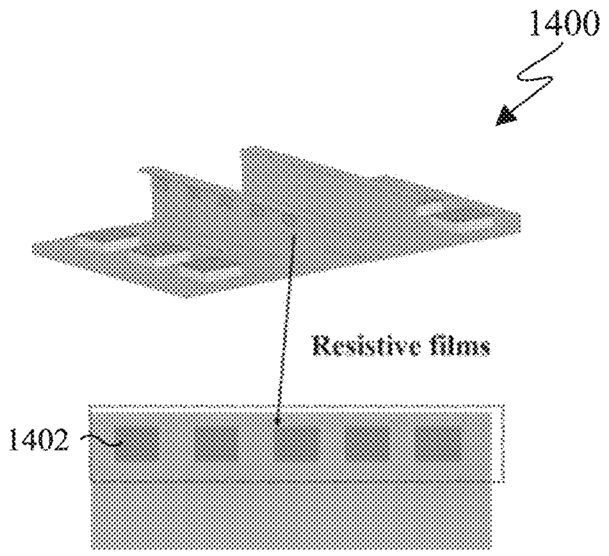
FIG. 14 illustrates an example antenna isolator with resistive films in accordance with this disclosure.

FIG. 14 illustrates an example antenna isolator 1400 with resistive films 1402 in accordance with this disclosure. The embodiment of the antenna isolator 1400 illustrated in FIG. 14 is for illustration only. FIG. 14 does not limit the scope of this disclosure to any particular implementation of a dual-polarized massive MIMO system.

As shown in FIG. 14, resistive films 1402 can be attached on wall isolator 1400. Resistive film 1402 can improve isolation by suppressing surface current on the walls of the wall isolator 1400. The number of resistive films 1402 can be based on the transmission frequency of the transmitting antenna elements. In certain embodiments, the resistive film 1402 can be place on a single wall closest to the transmission antenna elements. In certain embodiments, the resistive film 1402 can be place on a surface of the outer walls facing the respective adjacent arrays of antenna elements. By investing gating, the current density distribution on the walls with frequency, the appropriate positions of the resistive films can be determined.

Although FIG. 14 illustrates an example antenna isolator 1400 with resistive films 1402, various changes may be made to FIG. 14. For example, the sizes, shapes, and dimensions of the antenna isolator 1400 and its individual components can vary as needed or desired. Also, the number and placement of various components of the antenna isolator 1400 can vary as needed or desired. In addition, the antenna isolator 1400 may be used in any other suitable transmit-receive isolation enhancement for dual-polarized massive MIMO antenna array and is not limited to the specific processes described above.

Figure 15:
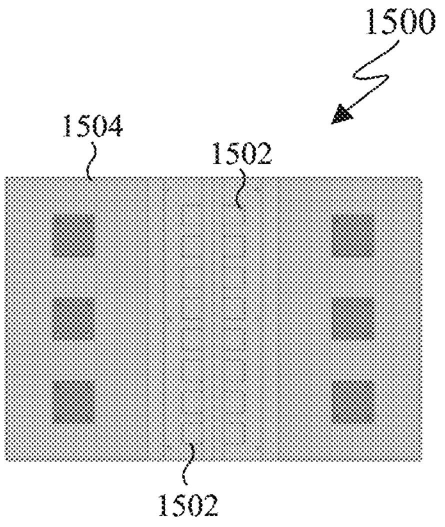
FIGS. 15 and 16 illustrate an example antenna isolator with grounded slots in accordance with this disclosure.
Figure 16:
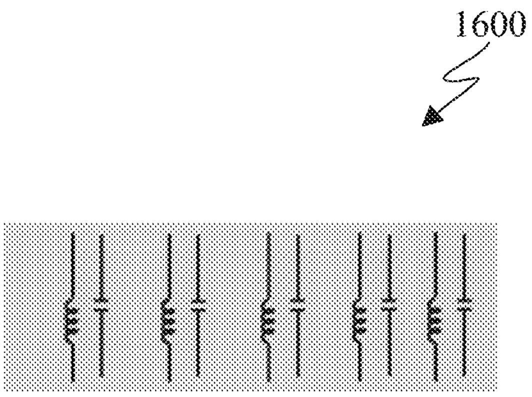

FIGS. 15 and 16 illustrate an example antenna isolator 1500 with grounded slots 1502 in accordance with this disclosure. In particular, FIG. 15 illustrates an example antenna isolator 1500 with grounded slots 1502 and FIG. 16 illustrates an example circuit analysis 1600 of the antenna isolator 1500. The embodiments of the antenna isolator 1500 with grounded slots 1502 shown in FIG. 15 and the example circuit analysis 1600 of the antenna isolator 1500 shown in FIG. 16 are for illustration only. FIGS. 15 and 16 do not limit the scope of this disclosure to any particular implementation of a dual-polarized massive MIMO system.

As shown in FIG. 15, slots 1502 can be etched on ground plane 1504 to suppress a surface current. Periodic slots 1502 improve isolation by creating the resonance with its associated equivalent LC circuit 1600. As shown in FIG. 16, an equivalent LC circuit 1600 of a slotted ground plane 1504. By combining the wall configuration with slotted ground plane 1504, the radiated propagation is reduced as well as surface wave propagation. However, a more complex structure poses more fabrication challenges with higher cost.

Although FIGS. 15 and 16 illustrate an example antenna isolator 1500 with grounded slots 1502 and an example circuit analysis 1600 of the antenna isolator 1500, various changes may be made to FIGS. 15 and 16. For example, the number and placement of various components of the antenna isolator 1500 with grounded slots 1502 shown in FIG. 15 and the example circuit analysis 1600 of the antenna isolator 1500 shown in FIG. 16 can vary as needed or desired. In addition, the antenna isolator 1500 with grounded slots 1502 shown in FIG. 15 and the example circuit analysis 1600 of the antenna isolator 1500 shown in FIG. 16 may be used in any other suitable transmit-receive isolation enhancement for dual-polarized massive MIMO antenna array and is not limited to the specific processes described above.

Figure 17:
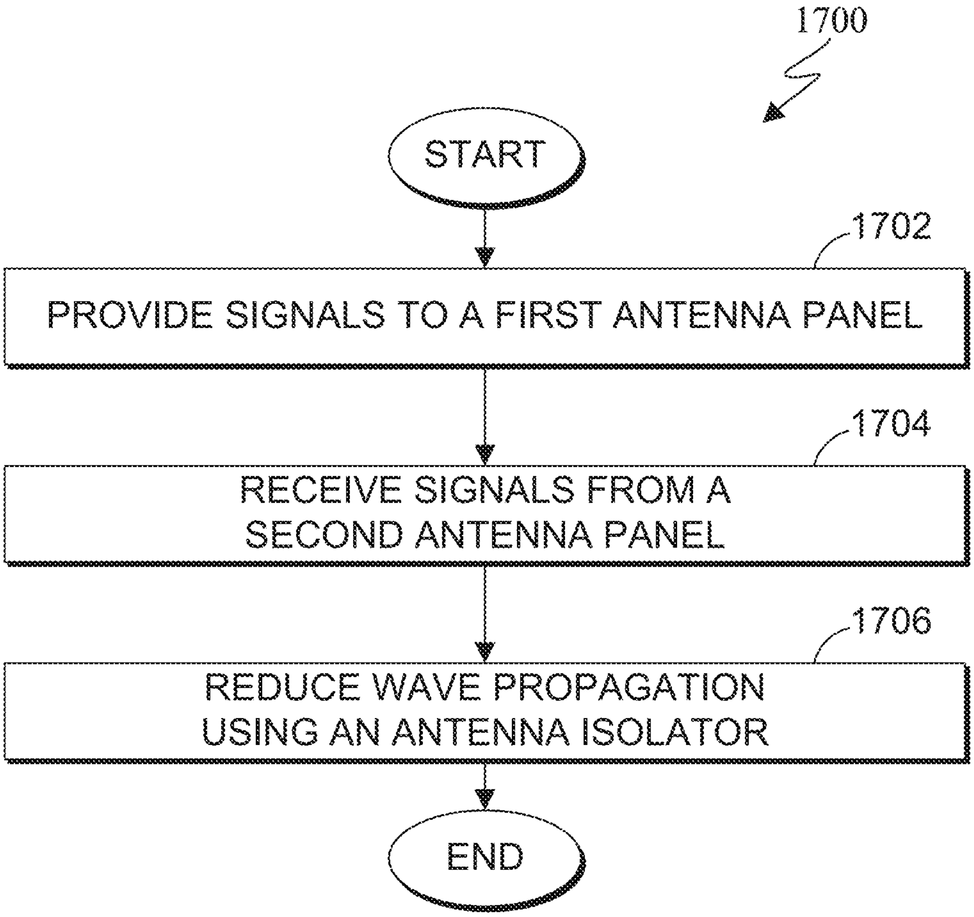
FIG. 17 illustrates an example method for transmit-receive isolation enhancement for a dual-polarized massive MIMO antenna array according to this disclosure.

FIG. 17 illustrates an example method 1700 for transmit-receive isolation enhancement for dual-polarized massive MIMO antenna array according to this disclosure. However, the method 1700 may be used with any other suitable system and any other suitable dual-polarized MIMO system.

As shown in FIG. 17, signals are provided to a first antenna panel at step 1702. The first antenna panel can be the first antenna array 304 of TX antennas 306. The signals can be provided from the TX processing circuitry 215 to the first antenna array 304 of TX antennas 306. The TX antennas 306 can propagate signals to a target receiver.

Signals are received from a second antenna panel at step 1704. The second antenna panel can be the second antenna array 308 of RX antennas 310. The received signals can be processed by the RX processing circuitry 220 coupled to the second antenna array 308 of RX antennas 310.

An antenna isolator 302 reduces wave propagation at step 1706. When signals are simultaneously transmitted through the first antenna panel and received by the second antenna panel, damaging interference can occur. The antenna isolator 302 can be provided between the first antenna panel and the second antenna panel. The antenna isolator 302 can include a plurality of walls extending outwardly from the substrate along a length of the substrate between the first antenna panel and the second antenna panel, the antenna isolator configured to reduce wave propagation between the array of first antenna elements and the array of second antenna elements.

The plurality of walls of the antenna isolator can include a T-shaped wall 1206 between at least two L-shaped walls. The T-shaped wall 1206 can be configured to reduce horizontal diffraction. The T-shaped wall 1206 can include a first wall that extends outwardly from the substrate along the length of the substrate, a second wall that extends in a first direction from a second end of the first wall that is opposite to a first end of the first wall adjacent to the substrate, and a third wall that extends in a second direction opposite to the first direction from the second end of the first wall.

A first L-shaped wall 1202 can be positioned between the T-shaped wall 1206 and the first antenna panel. The first L-shaped wall 1202 configured to reduce directed path and vertical diffraction from the array of first antenna elements. The first L-shaped wall 1202 can include a first wall that extends outwardly from the substrate along the length of the substrate and a second wall that extends at a second end of the first wall that is opposite to a first end of the first wall adjacent to the substrate in the first direction towards the first antenna panel.

A second L-shaped wall 1204 positioned between the T-shaped wall 1206 and the second antenna panel. The second L-shaped wall 1204 can include a first wall that extends outwardly from the substrate along the length of the substrate and a second wall that extends at a second end of the first wall that is opposite to a first end of the first wall adjacent to the substrate in the second direction towards the second antenna panel.

Lengths of extensions from the substrate of first and second walls of the first L-shaped wall 1202 can be selected as a function of a resonance frequency of the first antenna panel to reduce diffraction from the first antennal panel. Lengths of extensions from the substrate of first and second walls of the second L-shaped wall 1204 can be selected as a function of a resonance frequency of the second antenna panel to reduce diffraction from the second antennal panel. A distance between the first 1202 and second L-shaped walls 1204 is selected as a function of a resonance frequency of the first antenna panel to reduce a port-to-port coupling.

In certain embodiments, the antenna isolator can include a third L-shaped wall 1208. The third L-shaped wall 1208 positioned between the first L-shaped wall 1202 and the T-shaped wall 1206. The third L-shaped wall 1208 can include a first wall that extends outwardly from the substrate along the length of the substrate and a second wall that extends at a second end of the first wall that is opposite to a first end of the first wall adjacent to the substrate in the first direction away from the T-shaped wall 1206.

In certain embodiments, the antenna isolator can include a fourth L-shaped wall 1210. The fourth L-shaped wall 1210 positioned between the second L-shaped wall 1204 and the T-shaped wall 1206. The fourth L-shaped wall 1210 can include a first wall that extends outwardly from the substrate along the length of the substrate and a second wall that extends at a second end of the first wall that is opposite to a first end of the first wall adjacent to the substrate in the second direction away from the T-shaped wall 1206.

The antenna isolator can include resistive films applied to a surface of the antenna isolators. The resistive films can be applied to a surface of the outer first L-shaped wall 1202 and second L-shaped wall 1204 that is adjacent to the respective antenna panels. The antenna isolator can also include slots etched into a ground place to suppress a surface current.

Although FIG. 17 illustrates one example of a method 1700 for transmit-receive isolation enhancement for a dual-polarized MIMO antenna array, various changes may be made to FIG. 17. For example, while shown as a series of steps, various steps in FIG. 17 may overlap, occur in parallel, or occur any number of times.

Figure 18:
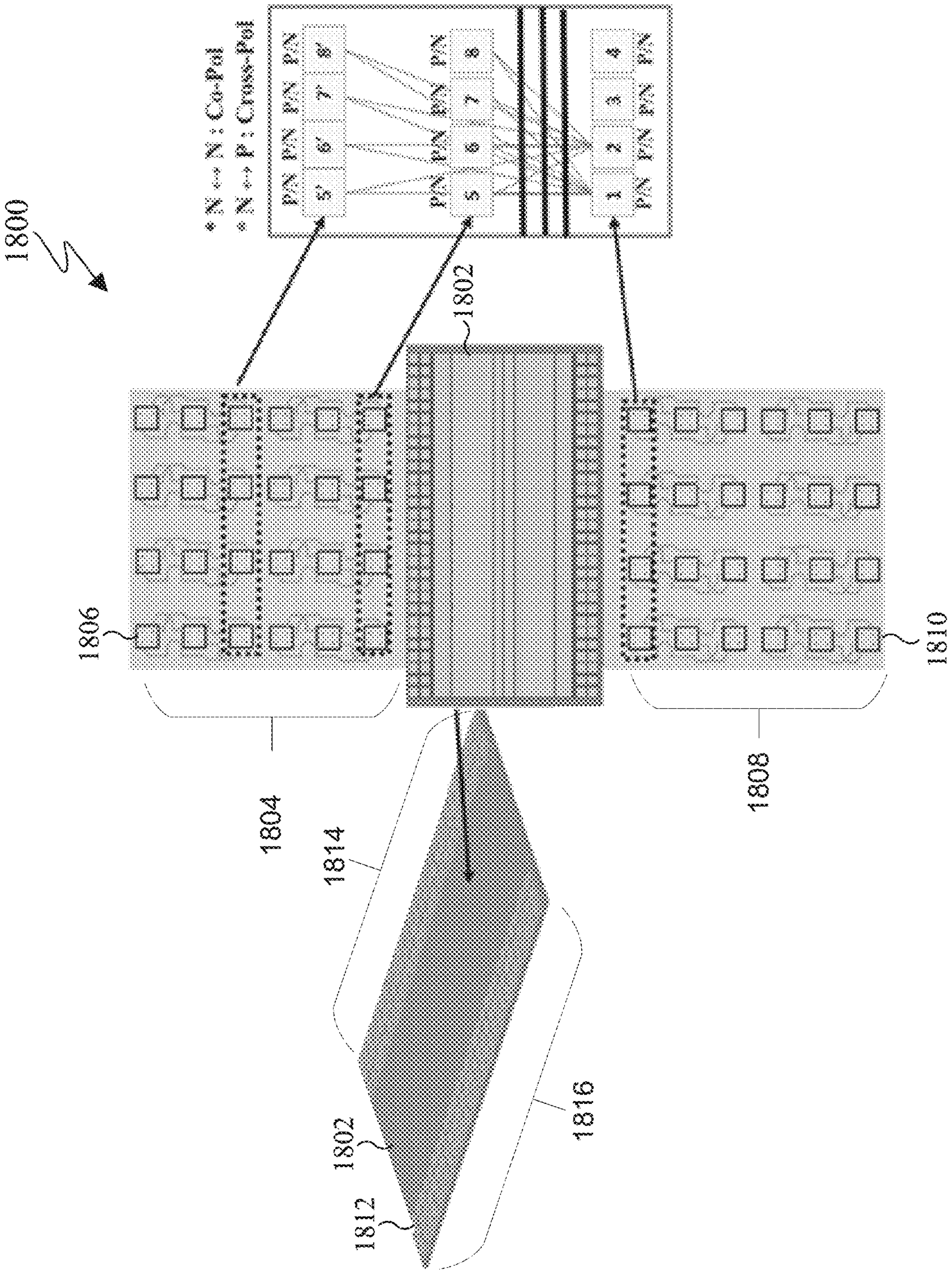
FIG. 18 illustrates a dual-polarized MIMO system with an antenna isolator including electromagnetic band-gap (EBG) elements in accordance with this disclosure.

FIG. 18 illustrates a dual-polarized MIMO system 1800 with an antenna isolator 1802 including EBG elements 1812 in accordance with this disclosure. The embodiment of the dual-polarized MIMO system 1800 illustrated in FIG. 18 is for illustration only. FIG. 18 does not limit the scope of this disclosure to any particular implementation of a dual-polarized MIMO system.

As shown in FIG. 18, the dual-polarized MIMO system 1800 includes a first antenna array 1804 of TX antennas 1806, such as antennas 205*a*-205*n* of FIG. 2, and a second antenna array 1808 of RX antennas 1810, such as antennas 206*a*-206*n* of FIG. 2. It is understood that, while illustrated as a first antenna array 1804 is positioned adjacent to a second antenna array 1808, a similar arrangement can be created wherein the first antenna array 1804 of TX antennas 1806 can be additionally or alternatively placed below or to the left or right of the second antenna array 1808 of RX antennas 1810 illustrated in FIG. 18.

The dual-polarized MIMO system 1800 can include an electromagnetic (EM) antenna isolator 1802 with, multiple TX antennas 1806, and multiple RX antennas 1810. The first antenna array 1804 of TX antennas 1806 can be formed of TX/RX antennas 205*a*-205*n* for massive MIMO operation. During TDD mode, the TX antennas 1806 can perform both DL TX and UL RX operations in different time slots. During XDD mode, the TX antennas 1806 can only perform DL TX operations.

The RX antennas 1810 can perform UL RX operations during XDD mode. In some embodiments, the RX antennas 1810 may not operate during TDD mode, while in other embodiments, the RX antennas 1810 can perform UL RX operations during TDD mode alongside the TX antennas 1806. During XDD mode, the UL RX operations can be performed by the RX antennas 1810 in the same time slots in which the TX antennas 1806 can perform DL TX operations.

The antenna isolator 1802 can provide isolation between the first antenna array 1804 of TX antennas 1806 and the second antenna array 1808 of RX antennas 1810. This at least partially protects the RX antennas 1810 from TX leakage from the TX antennas 1806 during XDD mode. By optimizing the wall parameters of the antenna isolator 1802, a phase path difference can be tuned to produce a destructive mode of wave propagation. The result, via the designed wall, is a reduction of propagation waves including direct path, horizontal diffraction, and vertical diffraction, resulting in significant improvement of antenna isolation.

The antenna isolator 1802 can also include a plurality of EBG elements 1812 arranged in a first EBG array 1814 and a second EBG array 1816. The first EBG array 1814 can be positioned along an edge of the first antenna array 1804 for a length of the substrate. The first EBG array 1814 can reduce surface wave propagation from the first antenna array 1804. The second EBG array 1816 can be positioned along an edge of the second antenna array 1808 for a length of the substrate. The second EBG array 1816 can reduce surface wave propagation from the second antenna array 1808. The EBG elements 1812 can be designed to act as frequency selective band-stop filters significantly reducing surface wave propagation.

Although FIG. 18 illustrates a dual-polarized MIMO system 1800 with an antenna isolator 1802 including EBG elements 1812, various changes may be made to FIG. 18. For example, the sizes, shapes, and dimensions of the dual-polarized MIMO system 1800 and its individual components can vary as needed or desired. Also, the number and placement of various components of the dual-polarized MIMO system 1800 can vary as needed or desired. In addition, the dual-polarized MIMO system 1800 may be used in any other suitable low-profile frequency-selective antenna isolation enhancement process for a dual-polarized MIMO antenna array and is not limited to the specific processes described above.

Figure 19:
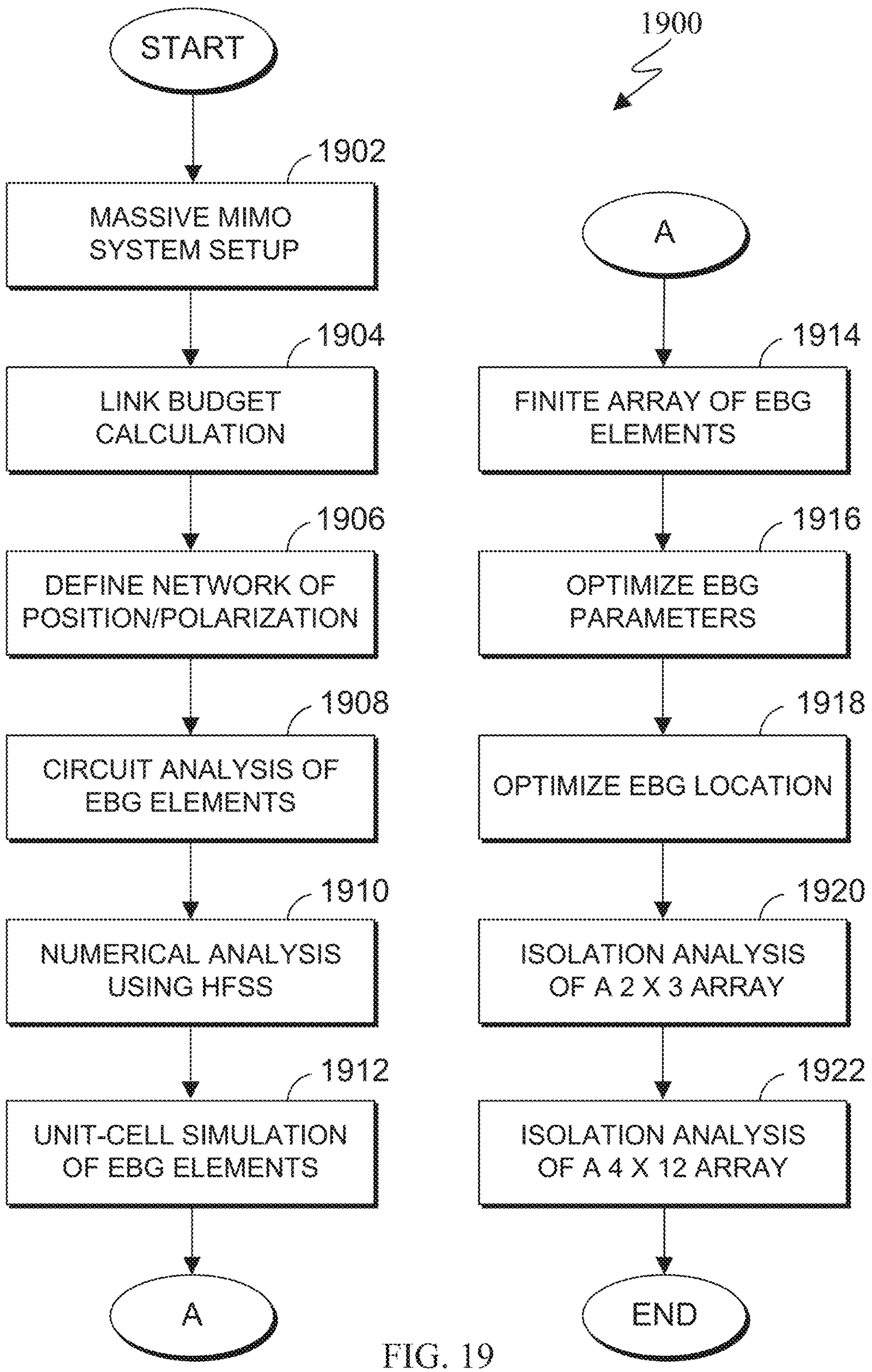
FIGS. 19-24C illustrate an example method for design of a dual-polarized MIMO antenna array with low-profile frequency-selective antenna isolation enhancement according to this disclosure.
Figure 20:
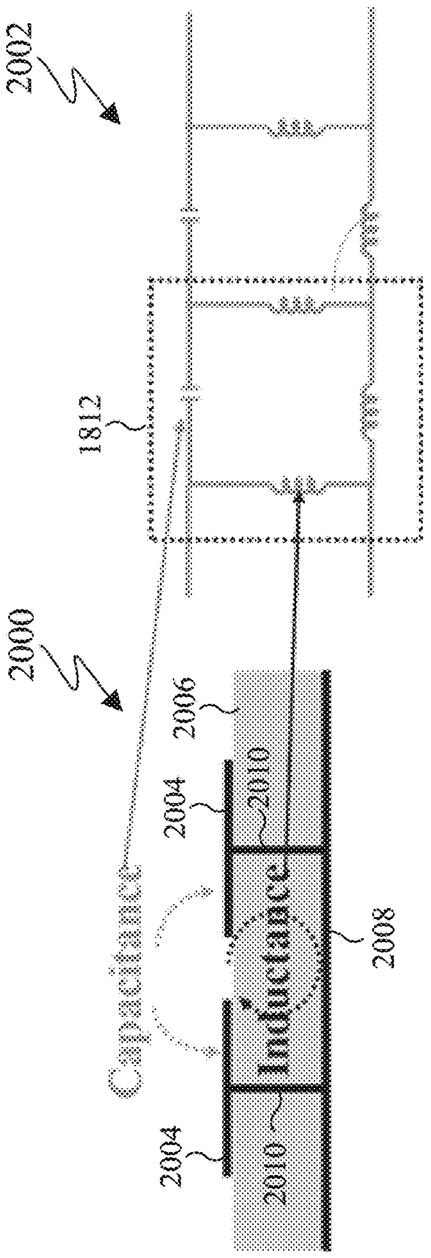
Figure 21:
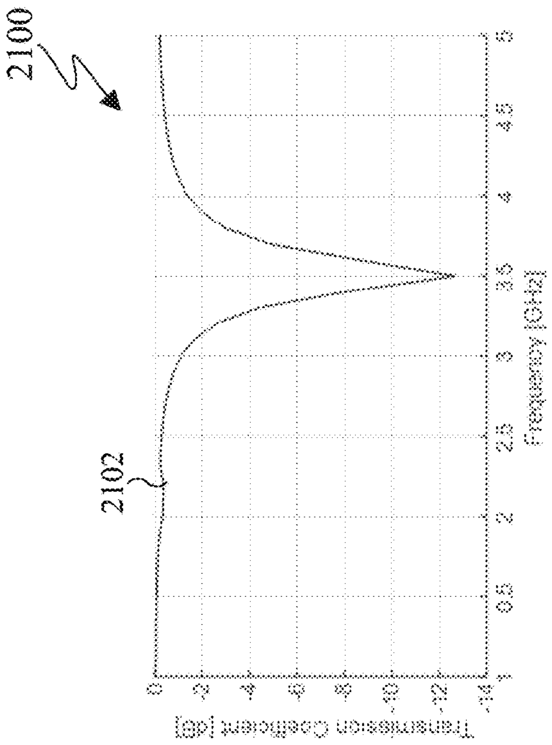
Figure 22:
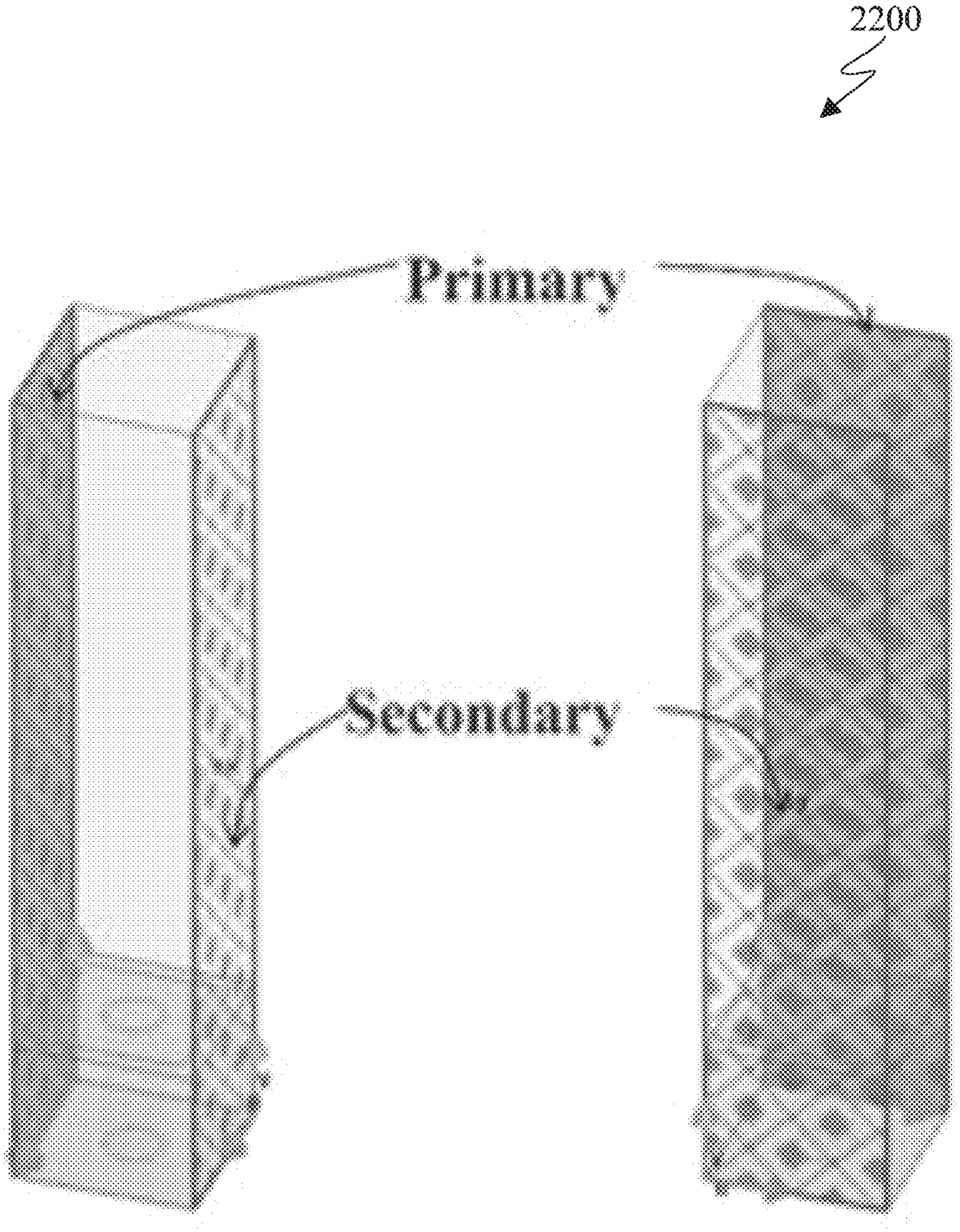
Figure 23A:
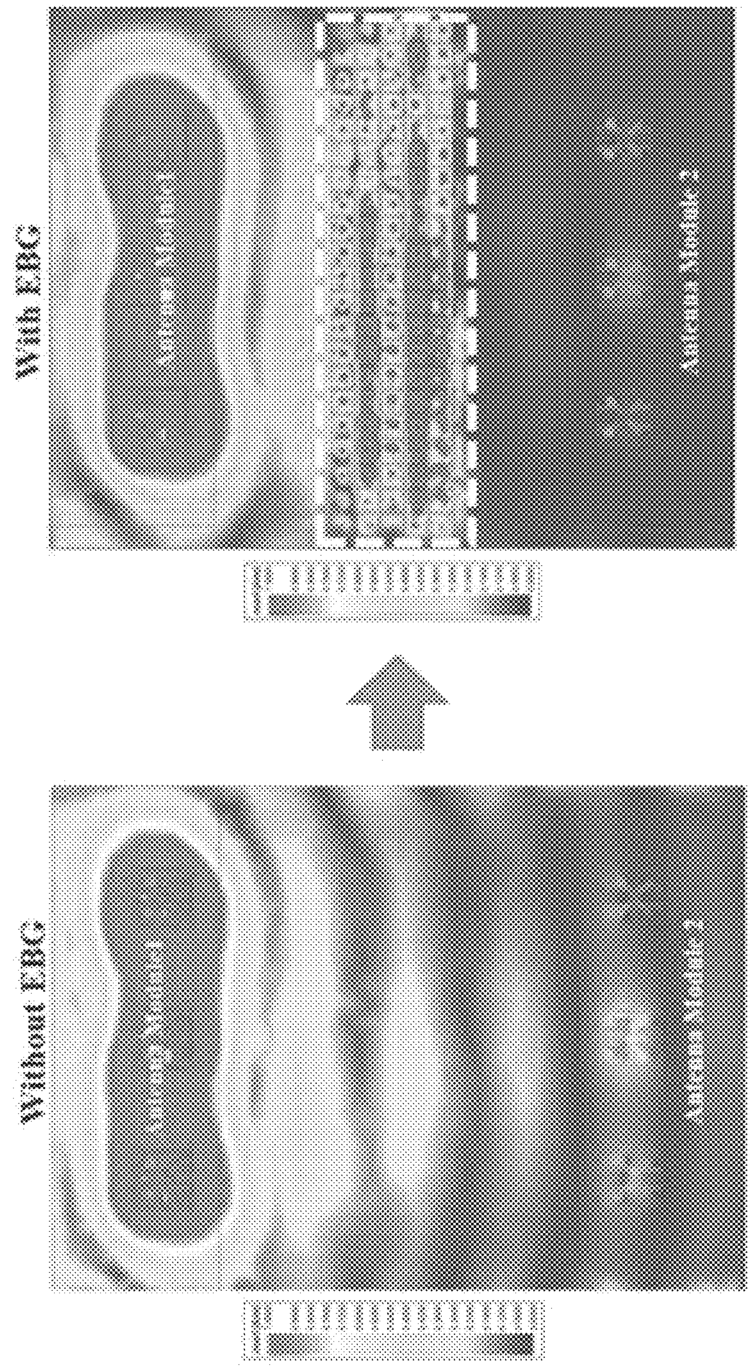
Figure 23B:
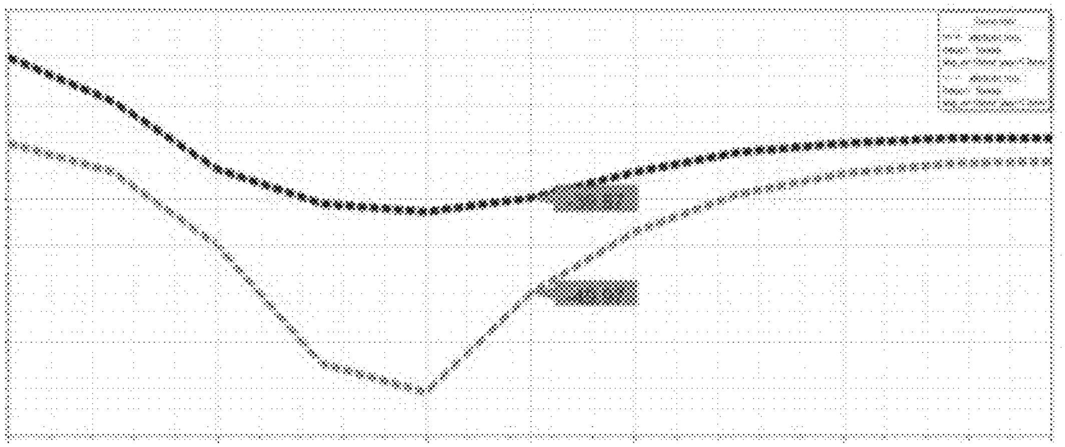
Figure 23C:
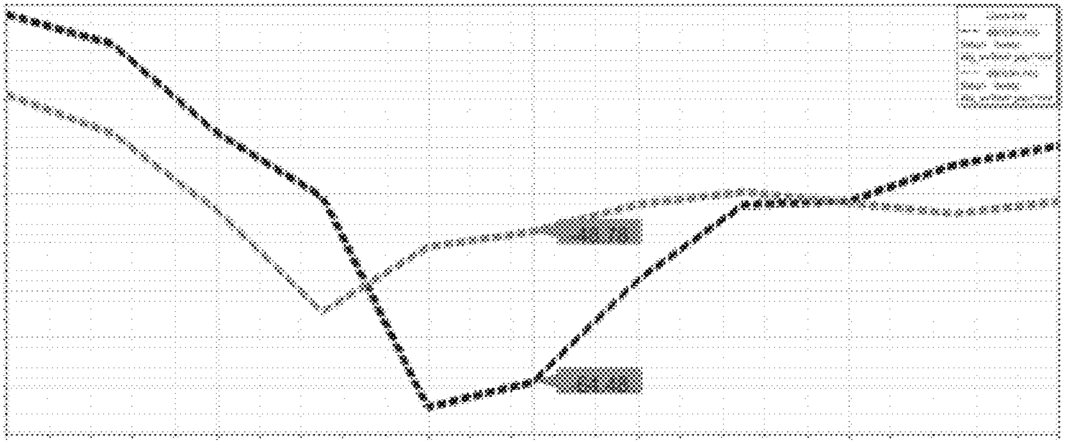
Figure 24C:
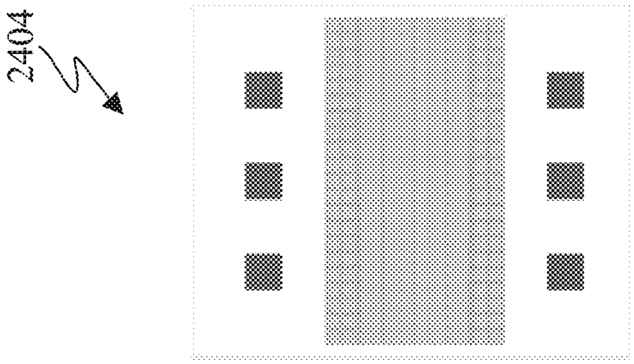

FIGS. 19-24C illustrates an example method 1900 for design of a dual-polarized MIMO system 1800 with low-profile frequency-selective antenna isolation enhancement according to this disclosure. In particular, FIG. 19 illustrates an example flowchart for method 1900, FIG. 20 illustrates an example theoretical analysis 2000 and circuit analysis 2002, FIG. 21 illustrates an example graph 2100 for a transmission coefficient 2102 of an EBG element 1812, FIG. 22 illustrates an example unit-cell boundary condition 2200 of an EBG element 1812, FIGS. 23A-23C illustrate an example parametric analysis for step 1916, and FIGS. 24A-24C illustrate an example first isolation analysis for step 1920 using a small 2×3 array. However, the method 1900 may be used with any other suitable system and any other suitable dual-polarized MIMO system.

As shown in FIG. 19, the MIMO system 1800 can be setup at step 1902. The setup can include determining an amount of TX antennas 1806 in the first antenna array 1804 and RX antennas 1810 in the second antenna array 1808. For example, the MIMO system 1800 shown in FIG. 18 is modeled with sixteen TX antennas 1806 and sixteen RX antennas 1810.

A link budget calculation is performed for the MIMO system 1800 at step 1904. The link budget is dependent on a distance to target and frequencies and gains of the antennas. The link budget accounts for all of the gains and losses from the transmitter at BS 102 through a transmission medium to the target receiver or UE 104, 111-116.

The antenna element positioning, and polarization is defined for the MIMO system 1800 at step 1906. The positions of the antenna elements and polarization is important for transmitting and receiving signals. Each antenna element can be logically mapped onto a single antenna port. In general, one antenna port can correspond to multiple antenna elements. The vertical dimension (consisting of six rows) facilitates elevation beamforming in addition to the azimuthal beamforming across the horizontal dimension (consisting of four columns of dual polarized antennas).

A theoretical analysis 2000 and circuit analysis 2002 of EBG elements 1812 can be performed for the at step 1908. As shown in FIGS. 20 AND 21, the theoretical analysis 2000 can be used to design the antenna isolator 1802 to surface wave propagation. The EBG elements 1812 includes patches 2004 positioned on a substrate 2006 and each patch 2004 is connected to a ground plane 2008 through vias 2010. The EBG elements 1812 play a role of an L-C band-stop filter, i.e., the circuit is an open termination in case of resonance frequency. The side view of EBG element 1812 reveals that the equivalent inductance is created due to interaction between the coupling wave and the metals such as vias 2010 and ground plane 2008. The capacitance is guided because of the adjacent patches 2004. As illustrated in FIGS. 20 and 21, the guided capacitance between the patches 2004 and inductance on the vias 2010 and the ground plane 2008 are considered as an equivalent LC circuit. To verify the characteristic of a band-stop filter, a circuit simulation is utilized. FIG. 21 illustrates a transmission coefficient 2102 of EBG element showing band-stop performance at 18.5 GHz.

As shown in FIG. 19, a numerical analysis using a high-frequency structure simulator (HFSS) can be performed on the MIMO system 300 at step 1910. The HESS is software for design and simulating high-speed, high-frequency electronics taking factors into consideration that may be too complex for a theoretical analysis, such as material properties. Dimensions such as the size of the EBG elements 1812 and spacing between the EBG elements 1812 can be optimized using the numerical analysis. To accurately identify electromagnetic fields within massive MIMO system 1800, numerical methods are used to study surface wave mode propagation. Ansys HFSS simulator is used in this work. As the EBG elements 1812 are periodically-distributed finite arrays, the infinite array assumption is used to identity its frequency response behavior.

A unit-cell simulation of EBG elements 1812 in the MIMO system 1800 can be performed at step 1912. As shown in FIG. 22, a unit-cell periodic boundary conditions 2200 of EBG elements can be determined. For example, the dispersion diagram is studied by periodic boundary condition simulation using phase difference on the unit cell, which can be used to check if there is slope given the frequency spectrum.

A parametric analysis can be performed utilizing a finite array of EBG elements 1812 to optimize the EBG dimensions for the MIMO system 1800 in step 1914. As shown in FIG. 23A-23C, a finite array is utilized to optimize the EBG dimensions, substrate properties and EBG array locations. A dual-polarized 2×3 antenna array is analyzed. The element spacing of one panel is designed as 0.75λ and panel-to-panel spacing is 2.5λ. FIG. 23A shows that EBG elements 1812 are capable of absorbing the transmitted wave modes based on surface current distributions. FIGS. 23B and 23C illustrate port-to-port coupling 2300, 2302 of 3H to 1H and 3H to 1V with EBG elements 1812 and without EBG elements 1812. The EBG parameters are optimized based on better isolation at 3.5 GHz. Simulation results show that EBG elements 1812 re-radiate adding to desired radiation outwards. However, the EBG elements 1812 are blocking the leakage from the top towards bottom panel.

The EBG parameters can be optimized for the MIMO system 1800 in step 1916. The EBG locations can be optimized for the MIMO system 1800 in step 1918. As previous discussions are based on assumptions of ideal environment without considerations of specific array configurations, numerical methods are used to analyze electromagnetic fields of each port-to-port coupling. The theoretical values can be used as a starting point. Next, numerical methods are used to optimize the parameters, such as using Ansys HFSS simulator. Further, a height of side walls/middle walls and spacing between walls can be optimized.

Figure 24B:
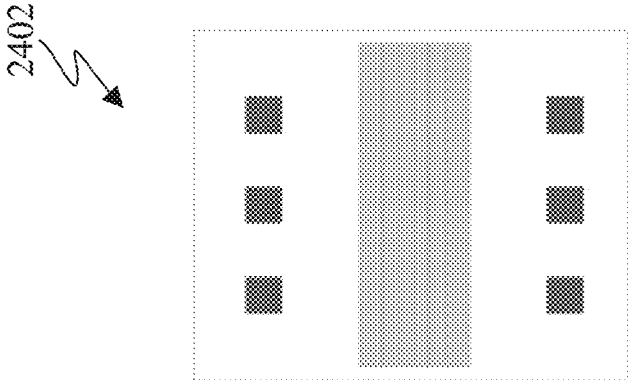
Figure 24A:
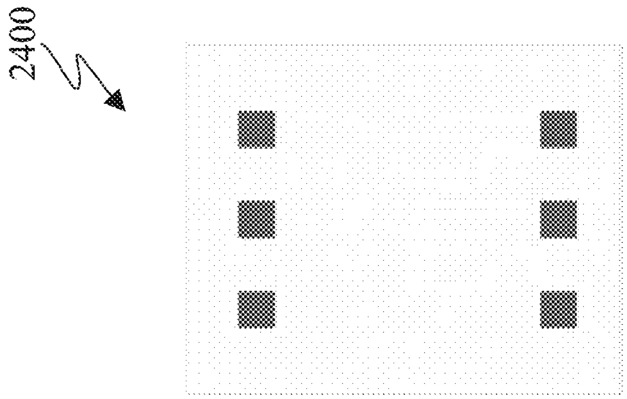

An isolation analysis of a 2×3 array can be performed for the MIMO system 1800 in step 1920. As shown in FIGS. 24A-24C an example isolation analysis can be performed on a 2×3 antenna array 2400, a 2×3 antenna array 2402 with an antenna isolator 1802, and a 2×3 antenna array 2404 with an antenna isolator 1802 including EBG elements 1812. The array element is used as observation port with six port-to-port couplings including 1H-5V, 1V-5V, 2H-5V, 2V-5V, 3H-5V and 3V-5V. Three cases can be simulated including a 2×3 antenna array 2400 with existing technique, a 2×3 antenna array 2402 with an antenna isolator 1802, and a 2×3 antenna array with an antenna isolator 1802 and EBG elements 1812.

A second verification model can be performed for a dual-polarized 12×4 massive MIMO antenna array in step 1922. The antenna elements 1 and 2 are used for observation port, and dual polarization of 8 different ports are studied. Three cases are simulated: (A) antenna array with existing technique; (B) with one isolator; (C) antenna array according to embodiments of the present disclosure. Table 3 shows the co-polarization and cross-polarization results of port 1 and 2. All isolation levels of combined isolator is more than 72.9 dB, showing a 7 dB increase compared to the antenna isolator. Therefore, no matter for small array or large array, the designed antenna isolator with EBG elements can simultaneously improve all port-to-port coupling, showing a 7-14 dB improvement for worst isolation.

TABLE 3

Comparison of antenna coupling of a 12 × 4 array with different techniques/designed isolators

| | N5 | N6 | N7 | N8 | P5 | P6 | P7 | P8 | N5 | N6 | N7 | N8 | P5 | P6 | P7 | P8 |
|---|---|---|---|---|---|---|---|---|---|---|---|---|---|---|---|---|
| A | −58.5 | −61.5 | −66.2 | −66.3 | −50.6 | −56.1 | −64.1 | −69.7 | −59.2 | −55.9 | −55.7 | −61.8 | −59.5 | −55.1 | −57.3 | −62.4 |
| B | −68.2 | −67.5 | −65.8 | −74.8 | −69.5 | −79.2 | −73.2 | −65.9 | −68.3 | −65.8 | −66.8 | −65.1 | −69.9 | −71.9 | −74.5 | −68.9 |
| C | −73.0 | −74.5 | −81.5 | −73.3 | −77.3 | −73.5 | −80.8 | −75.8 | −73.5 | −80.7 | −82.5 | −78.7 | −72.9 | −79.1 | −79.6 | −72.0 |
| | N5' | N6' | N7' | N8' | P5' | P6' | P7' | P8' | N5' | N6' | N7' | N8' | P5' | P6' | P7' | P8' |
| A | −64.7 | −68.4 | −73.3 | −96.0 | −60.7 | −71.8 | −75.1 | −78.0 | −76.9 | −74.9 | −79.7 | −70.3 | −67.9 | −75.4 | −75.3 | −78.7 |
| B | −78.5 | −71.3 | −87.1 | −68.3 | −66.3 | −71.8 | −66.9 | −70.8 | −77.1 | −80.8 | −76.8 | −87.1 | −77.2 | −80.9 | −76.1 | −76.2 |
| C | −77.5 | −83.4 | −90.0 | −78.9 | −80.9 | −86.5 | −87.5 | −81.7 | −77.2 | −91.8 | −84.6 | −81.6 | −86.8 | −88.4 | −85.8 | −84.0 |

Although FIGS. 19-24C illustrates an example method 1900 for design of a dual-polarized MIMO system 1800 with low-profile frequency-selective antenna isolation enhancement, various changes may be made to FIGS. 19-24C. For example, while shown as a series of steps, various steps in FIGS. 19-24C may overlap, occur in parallel, or occur any number of times.

Figure 25B:
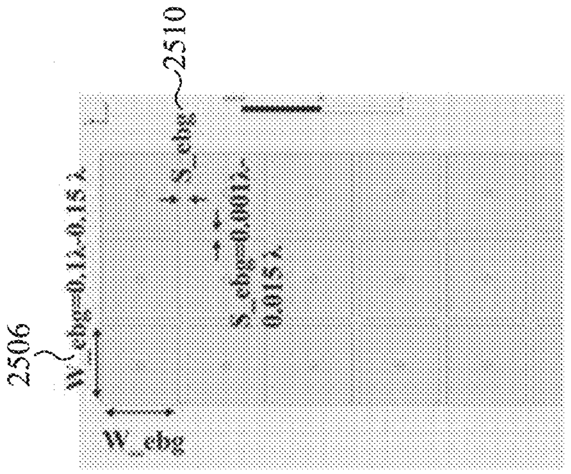
FIGS. 25A through 25C illustrate an example array of EBG elements in accordance with this disclosure.
Figure 25C:
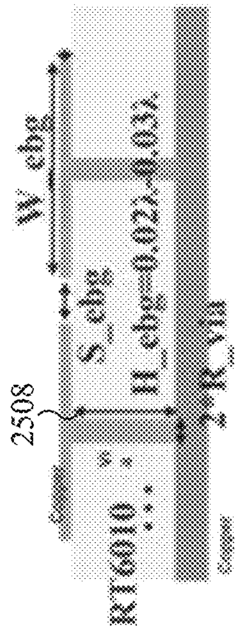
Figure 25A:
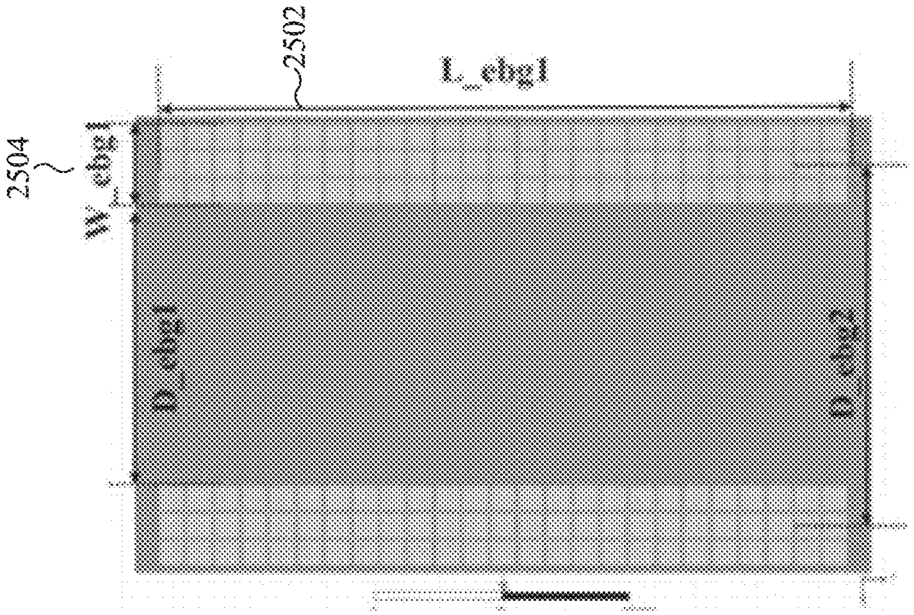

FIGS. 25A through 25C illustrate an example array of EBG elements 1812 in accordance with this disclosure. In particular, FIG. 25A illustrates a top view of an example EBG 1812, FIG. 25B illustrates an enlarged portion of the top view of an EBG 1812, and FIG. 25C illustrates a side view for EBG 1812. The embodiments of the example EBG elements 1812 illustrated in FIGS. 25A through 25C are for illustration only. FIGS. 25A through 25C do not limit the scope of this disclosure to any particular implementation of a dual-polarized massive MIMO system.

As shown in FIGS. 25A through 25C, optimized parameters are provided for and EBG elements 1812. Parameters L_ebg1 2502, W_ebg1 2504 are determined based on a size of the antenna array. Parameters W_ebg 2506, H_ebg 2508, S_ebg 2510 are presented with optimized range with wavelength (Substrate: RT6010). Parameter W_ebg 2506 can be determined based on 0.1λ-0.15λ. Parameter H_ebg 2508 can be determined based on 0.02λ-0.03λ. Parameter S_ebg 2510 can be determined based on 0.001λ-0.015λ.

The antenna isolator 1802 can include a first EBG element positioned along an edge of the first antenna panel for a length of the substrate and configured to reduce surface wave propagation from the first antenna elements in the first antenna panel. The first EBG element can include a plurality of patches positioned on the substrate and linearly spaced along an edge of the first antenna panel for a length of the substrate. The first EBG element can also include a plurality of first via, where each via connects a first patch to the ground plane.

The antenna isolator 1802 can include a second EBG element positioned along an edge of the second antenna panel for a length of the substrate and configured to reduce surface wave propagation from the second antenna elements in the second antenna panel. The second EBG element can include a plurality of patches positioned on the substrate and linearly spaced along an edge of the second antenna panel for a length of the substrate. The second EBG element can also include a plurality of second via, where each via connects a second patch to the ground plane.

Although FIGS. 25A through 25C illustrate an example array of EBG elements 1812 in accordance with this disclosure. For example, the sizes, shapes, and dimensions of the example EBG elements 1812 and its individual components can vary as needed or desired. Also, the number and placement of various components of the example EBG elements 1812 can vary as needed or desired. In addition, the example EBG elements 1812 may be used in any other suitable low-profile frequency-selective antenna isolation enhancement for dual-polarized massive MIMO antenna array and is not limited to the specific processes described above.

Figure 26B:
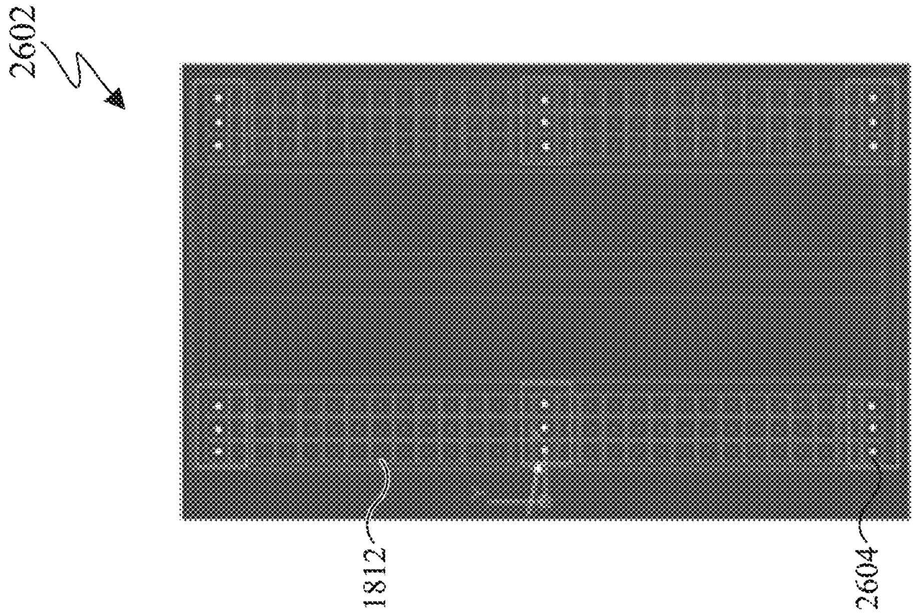
FIGS. 26A and 26B illustrate an example EBG boards in accordance with this disclosure.
Figure 26A:
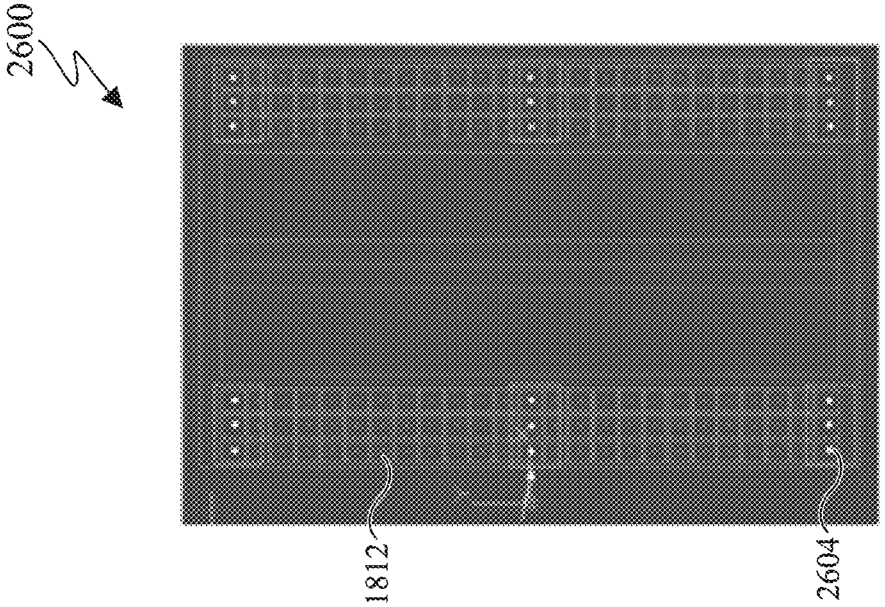

FIGS. 26A and 26B illustrate an example EBG boards 2600, 2602 in accordance with this disclosure. In particular, FIG. 26A illustrates a top view of EBG boards 2600 with twenty five EBG elements 1812 and FIG. 26B illustrates a top view of EBG boards 2602 with twenty nine EBG elements 1812. The embodiments of the example EBG boards 2600, 2602 illustrated in FIGS. 26A and 26B are for illustration only. FIGS. 26A and 26B do not limit the scope of this disclosure to any particular implementation of a dual-polarized massive MIMO system.

As shown in FIGS. 26A and 26B, an assembly layout is illustrated with eighteen mounting holes 2604. Specifically, the mounting holes 2604 are located along the center and edge rows. EBG elements 1812 have advantages of easy fabrication, low profile, and low cost because it can be fabricated via standard Printed Circuit Board (PCB) techniques.

Although our designed solution works at sub-6 GHZ (3.4 GHz to 3.6 GHz) operation band, as EBG based parameters are determined by the wavelength at a given frequency, this antenna isolator can be also applied to higher frequencies such as mmWave bands. Therefore, this isolation component can be a candidate of 5G or 6G base station antenna isolators. There are some possible changes of EBG unit-cell parameters. One change can include modifying an EBG size based on higher frequency. As the filtering of EBG elements works at a given frequency, the frequency can be tuned with changes of EBG dimensions. Another change can include adjusting substrate material/height based on operational frequency. A further change can include changing a shape of EBG elements such as H-shape patch, which may improve the bandwidth of resonance frequency. An additional change can include modifying numbers of EBG elements to exhibit isolation improvement based on the size of a specific base-station antenna array. Another change can include removing walls and filling all of the space with EBG structures in many rows. The different isolator widths are shown using different numbers of EBG elements, i.e. 25 and 29 elements.

Although FIGS. 26A and 26B illustrate example EBG boards 2600, 2602, various changes may be made to FIGS. 26A and 26B. For example, the sizes, shapes, and dimensions of the example EBG boards 2600, 2602 and its individual components can vary as needed or desired. Also, the number and placement of various components of the example EBG boards 2600, 2602 can vary as needed or desired. In addition, the example EBG boards 2600, 2602 may be used in any other suitable low-profile frequency-selective antenna isolation enhancement for dual-polarized massive MIMO antenna array and is not limited to the specific processes described above.

Figure 27:
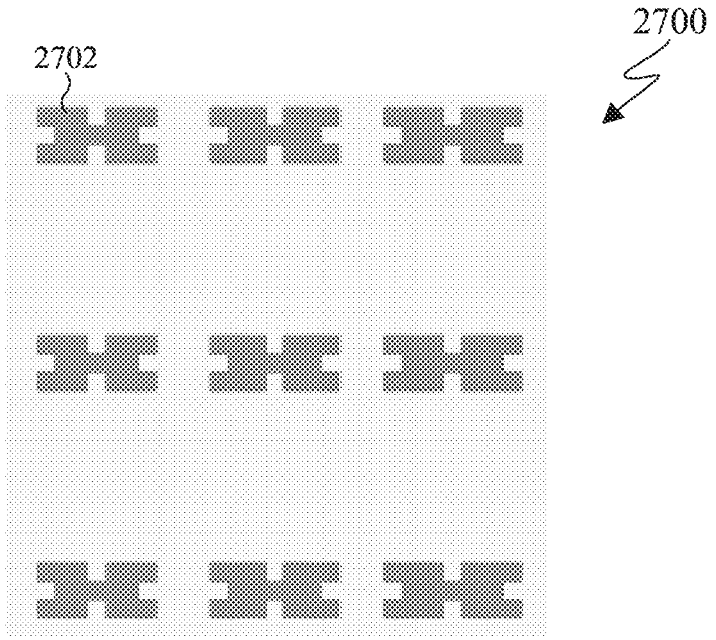
FIG. 27 illustrates an example alternative EBG elements using special patch elements according to this disclosure.

FIG. 27 illustrates an example alternative EBG elements 2700 using special patch elements 2702 according to this disclosure. The embodiment of the EBG elements 2700 illustrated in FIG. 27 is for illustration only. FIG. 27 does not limit the scope of this disclosure to any particular implementation of a dual-polarized massive MIMO system.

As shown in FIG. 27, an alternative frequency selective EBG element 2700 can include special patch elements 2702. Similar to the rectangular patch elements 1812, the patch elements 2702 can provide more freedom to tune the resonance frequency. Except for patch length/width, the etched slot size can also tune the resonance frequency and antenna isolation. The design procedures are similar to our designed: the infinite array assumption is used to identity its frequency response behavior. Next, a finite array is utilized to optimize the EBG dimensions, substrate properties and EBG array locations.

Although FIG. 27 illustrates alternative EBG elements 2700, various changes may be made to FIG. 27. For example, the number and placement of various components of the alternative EBG elements 2700 can vary as needed or desired. In addition, the alternative EBG elements 2700 may be used in any other suitable low-profile frequency-selective antenna isolation enhancement for dual-polarized massive MIMO antenna array and is not limited to the specific processes described above.

Figure 28A:
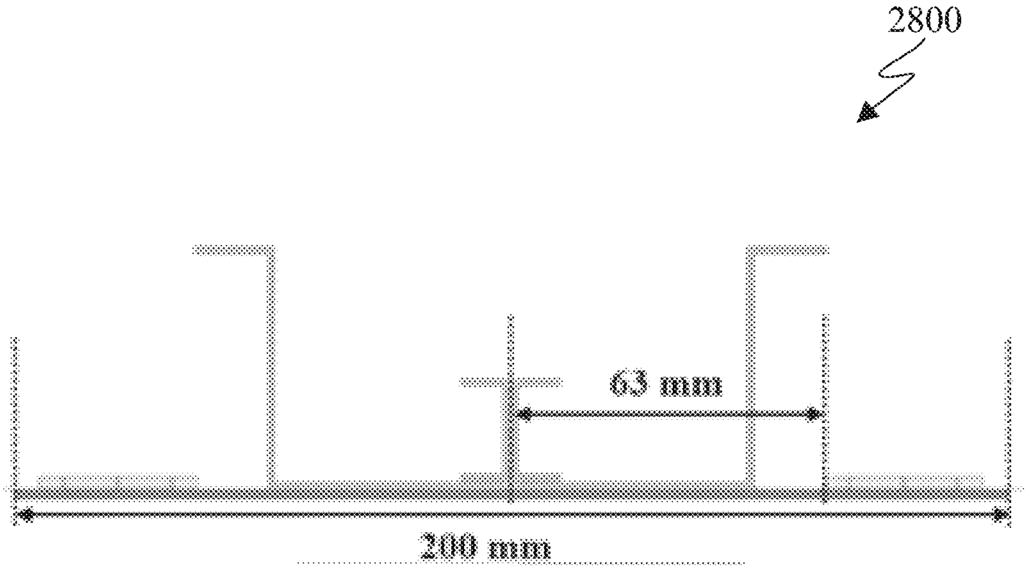
FIGS. 28A through 28C illustrate an example alternative EBG configurations in accordance with this disclosure.
Figure 28B:
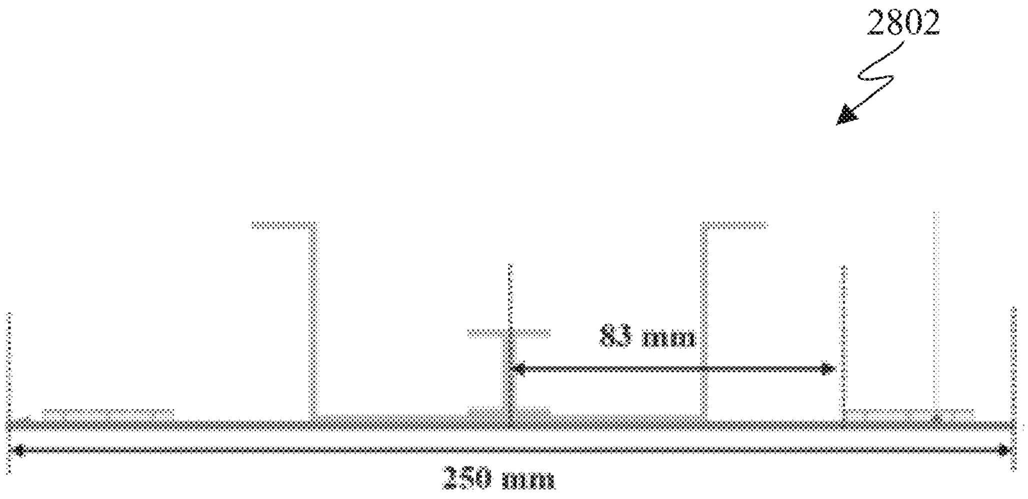
Figure 28C:
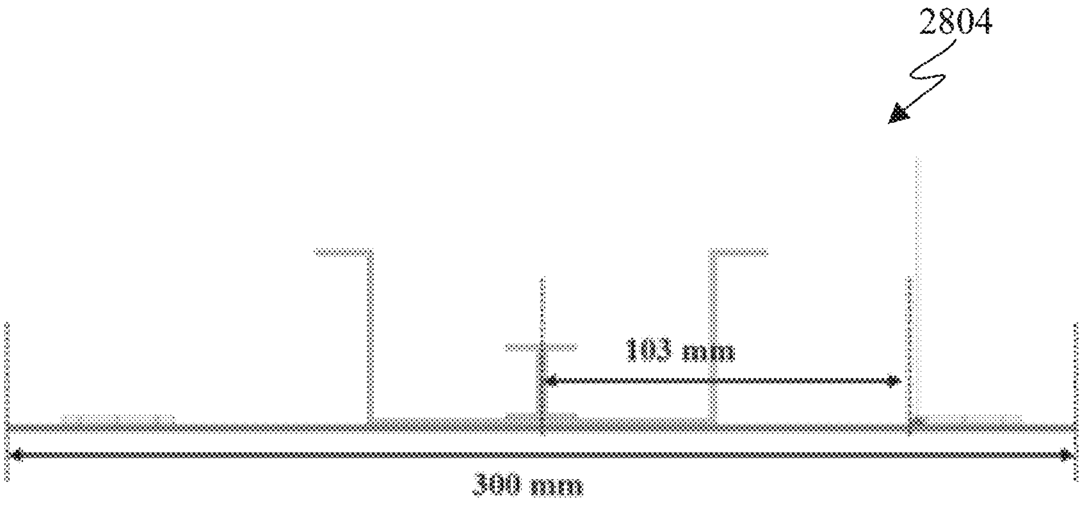

FIGS. 28A through 28C illustrate an example alternative EBG configurations 2800-2804 in accordance with this disclosure. In particular, FIG. 28A illustrates a second EBG configuration 2800, FIG. 28B illustrates a third EBG configuration 2802, and FIG. 28C illustrates a fourth EBG configuration 2804. The embodiments of the example alternative EBG configurations 2800-2804 illustrated in FIGS. 28A through 28C are for illustration only. FIGS. 28A through 28C do not limit the scope of this disclosure to any particular implementation of a dual-polarized massive MIMO system.

As shown in FIGS. 28A through 28C, possible changes of EBG array-level parameters are also possible. For example, locations of EBG elements can be modified to exhibit isolation improvement based on the size of a specific base-station antenna array. The gap between antenna panel and EBG structures can be increased or decreased based on other considerations. The stacked configuration can be used based on single-layer configurations.

FIGS. 28A-28C present different EBG array locations. Based on space limitations of antenna isolator, the EBG-to-antenna coupling can be tuned by different EBG locations. In addition, the panel length (or antenna panel spacing) can be adjusted for better isolation. The design procedures target at surface current distributions. Next, specific Port-to-port coupling is studied. The EBG parameters are optimized based on better isolation at 3.5 GHz.

FIGS. 28A through 28C illustrate an example alternative EBG configurations 2800-2804, various changes may be made to FIGS. 28A through 28C. For example, the sizes, shapes, and dimensions of the example alternative EBG configurations 2800-2804 and its individual components can vary as needed or desired. Also, the number and placement of various components of the example alternative EBG configurations 2800-2804 can vary as needed or desired. In addition, the example alternative EBG configurations 2800-2804 may be used in any other suitable low-profile frequency-selective antenna isolation enhancement for dual-polarized massive MIMO antenna array and is not limited to the specific processes described above.

Figure 29:
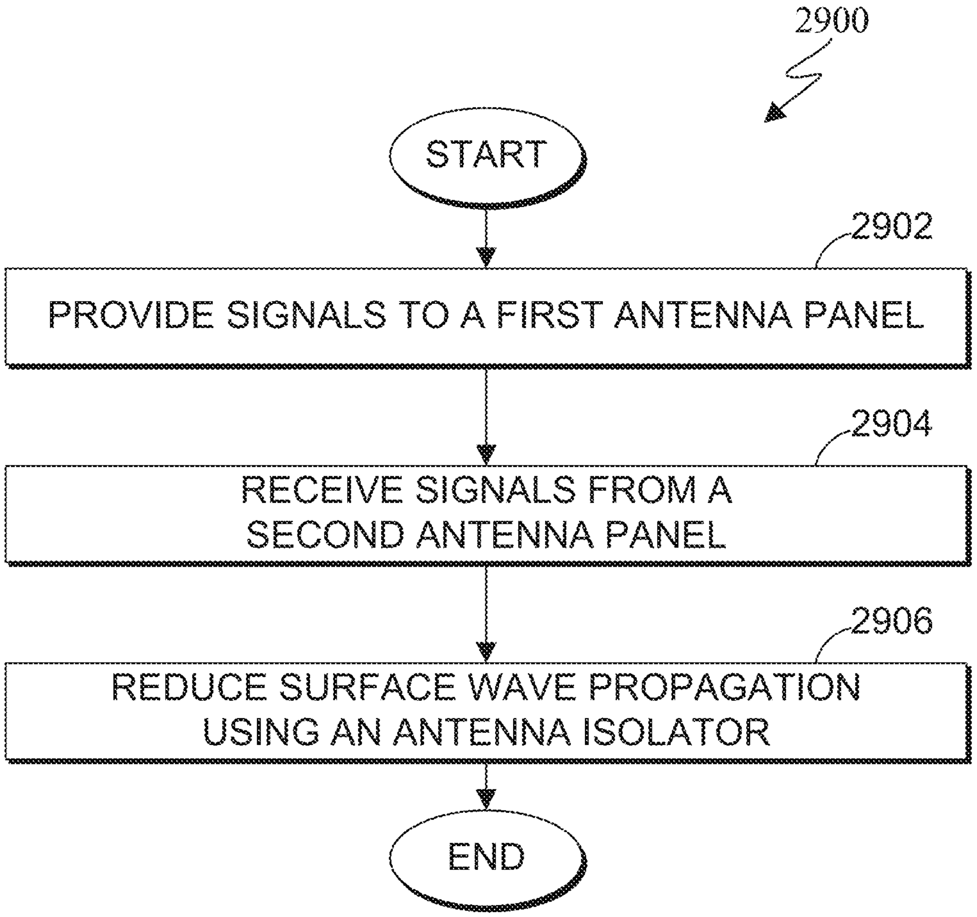
FIG. 29 illustrates an example method for low-profile frequency-selective antenna isolation enhancement for dual-polarized massive MIMO antenna array according to this disclosure.

FIG. 29 illustrates an example method 2900 for low-profile frequency-selective antenna isolation enhancement for dual-polarized massive MIMO antenna array according to this disclosure. However, the method 2900 may be used with any other suitable system and any other suitable dual-polarized MIMO system.

As shown in FIG. 29, signals are provided to a first antenna panel at step 2902. The first antenna panel can be the first antenna array 1804 of TX antennas 1806. The signals can be provided from the TX processing circuitry 215 to the first antenna array 1804 of TX antennas 1806. The TX antennas 1806 can propagate signals to a target receiver.

Signals are received from a second antenna panel at step 2904. The second antenna panel can be the second antenna array 1808 of RX antennas 1810. The received signals can be processed by the RX processing circuitry 220 coupled to the second antenna array 1808 of RX antennas 1810.

An antenna isolator 1802 reduces surface wave propagation at step 2906. When signals are simultaneously transmitted through the first antenna panel and received by the second antenna panel, damaging interference can occur. The antenna isolator 1802 can be provided between the first antenna panel and the second antenna panel. The antenna isolator 1802 can include a first EBG element and a second EBG element. The first EBG element can be positioned along an edge of the first antenna panel for a length of the substrate and configured to reduce surface wave propagation from the array of first antenna elements. The second EBG element can be positioned along an edge of the second antenna panel for a length of the substrate and configured to reduce surface wave propagation from the array of second antenna elements.

A ground plane can be coupled to the substrate. The first EBG element can include a plurality of first patches positioned on the substrate and linearly spaced along an edge of the first antenna panel for a length of the substrate, and a plurality of first vias, each first via connects a first patch to the ground plane. The second EBG element can include a plurality of second patches positioned on the substrate and linearly spaced along an edge of the second antenna panel for a length of the substrate, and a plurality of second vias, each second via connects a second patch to the ground plane.

The antenna isolator 1802 can include a plurality of walls extending outwardly from the substrate along a length of the substrate between the first antenna panel and the second antenna panel, the antenna isolator configured to reduce wave propagation between the array of first antenna elements and the array of second antenna elements.

The plurality of walls of the antenna isolator can include a T-shaped wall between at least two L-shaped walls. The T-shaped wall can be configured to reduce horizontal diffraction. The T-shaped wall can include a first wall that extends outwardly from the substrate along the length of the substrate, a second wall that extends in a first direction from a second end of the first wall that is opposite to a first end of the first wall adjacent to the substrate, and a third wall that extends in a second direction opposite to the first direction from the second end of the first wall.

A first L-shaped wall can be positioned between the T-shaped wall and the first antenna panel. The first L-shaped wall configured to reduce directed path and vertical diffraction from the array of first antenna elements. The first L-shaped wall can include a first wall that extends outwardly from the substrate along the length of the substrate and a second wall that extends at a second end of the first wall that is opposite to a first end of the first wall adjacent to the substrate in the first direction towards the first antenna panel.

A second L-shaped wall positioned between the T-shaped wall and the second antenna panel. The second L-shaped wall can include a first wall that extends outwardly from the substrate along the length of the substrate and a second wall that extends at a second end of the first wall that is opposite to a first end of the first wall adjacent to the substrate in the second direction towards the second antenna panel.

Lengths of extensions from the substrate of first and second walls of the first L-shaped wall can be selected as a function of a resonance frequency of the first antenna panel to reduce diffraction from the first antennal panel. Lengths of extensions from the substrate of first and second walls of the second L-shaped wall can be selected as a function of a resonance frequency of the second antenna panel to reduce diffraction from the second antennal panel. A distance between the first and second L-shaped walls is selected as a function of a resonance frequency of the first antenna panel to reduce a port-to-port coupling.

In certain embodiments, the antenna isolator can include a third L-shaped wall. The third L-shaped wall positioned between the first L-shaped wall and the T-shaped wall. The third L-shaped wall can include a first wall that extends outwardly from the substrate along the length of the substrate and a second wall that extends at a second end of the first wall that is opposite to a first end of the first wall adjacent to the substrate in the first direction away from the T-shaped wall.

In certain embodiments, the antenna isolator can include a fourth L-shaped wall. The fourth L-shaped wall positioned between the second L-shaped wall and the T-shaped wall. The fourth L-shaped wall can include a first wall that extends outwardly from the substrate along the length of the substrate and a second wall that extends at a second end of the first wall that is opposite to a first end of the first wall adjacent to the substrate in the second direction away from the T-shaped wall.

The antenna isolator can include resistive films applied to a surface of the antenna isolators. The resistive films can be applied to a surface of the outer first and second L-shaped walls that is adjacent to the respective antenna panels. The antenna isolator can also include slots etched into a ground place to suppress a surface current.

Although FIG. 29 illustrates one example of a method 2900 for low-profile frequency-selective antenna isolation enhancement for a dual-polarized MIMO antenna array, various changes may be made to FIG. 29. For example, while shown as a series of steps, various steps in FIG. 29 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a substrate;
a first antenna panel coupled on the substrate and comprising an array of first antenna elements;
a second antenna panel coupled on the substrate comprising an array of second antenna elements; and
an antenna isolator coupled on the substrate, the antenna isolator including:
a plurality of walls extending outwardly from the substrate along a length of the substrate between the first antenna panel and the second antenna panel, wherein the plurality of walls includes a T-shaped wall configured to reduce horizontal diffraction between at least two L-shaped walls and wherein the plurality of walls are configured to reduce wave propagation between the array of first antenna elements and the array of second antenna elements,
a first electromagnetic band-gap (EBG) element positioned along an edge of the first antenna panel for the length of the substrate between the first antenna panel and the plurality of walls and configured to reduce surface wave propagation from the array of first antenna elements, wherein the first EBG element includes a plurality of first patches positioned on the substrate and linearly spaced along the edge of the first antenna panel for the length of the substrate, and
a second EBG element positioned along an edge of the second antenna panel for the length of the substrate between the second antenna panel and the plurality of walls and configured to reduce surface wave propagation from the array of second antenna elements.

2. The apparatus of claim 1, further comprising:
a ground plane,
wherein the first EBG element further includes a plurality of first vias, each first via connects a first patch to the ground plane.

3. The apparatus of claim 2, wherein the second EBG element includes:
a plurality of second patches positioned on the substrate and linearly spaced along the edge of the second antenna panel for the length of the substrate, and
a plurality of second vias, each second via connects a second patch to the ground plane.

4. The apparatus of claim 1, wherein:
the T-shaped wall includes:
a first wall that extends outwardly from the substrate along the length of the substrate,
a second wall that extends in a first direction from a second end of the first wall that is opposite to a first end of the first wall adjacent to the substrate, and
a third wall that extends in a second direction opposite to the first direction from the second end of the first wall.

5. The apparatus of claim 4, wherein:
the at least two L-shaped walls of the plurality of walls of the antenna isolator further includes a first L-shaped wall positioned between the T-shaped wall and the first antenna panel, the first L-shaped wall configured to reduce directed path and vertical diffraction from the array of first antenna elements, and
the first L-shaped wall includes:
a first wall that extends outwardly from the substrate along the length of the substrate, and
a second wall that extends at a second end of the first wall that is opposite to a first end of the first wall adjacent to the substrate in the first direction towards the first antenna panel.

6. The apparatus of claim 5, wherein:
the at least two L-shaped walls of the plurality of walls of the antenna isolator further includes a second L-shaped wall positioned between the T-shaped wall and the second antenna panel, and
the second L-shaped wall includes:
a first wall that extends outwardly from the substrate along the length of the substrate, and
a second wall that extends at a second end of the first wall that is opposite to a first end of the first wall adjacent to the substrate in the second direction towards the second antenna panel.

7. The apparatus of claim 6, wherein:
lengths of extensions from the substrate of the first and second walls of the first L-shaped wall are selected as a function of a resonance frequency of the first antenna panel to reduce diffraction from the first antennal panel,
lengths of extensions from the substrate of the first and second walls of the second L-shaped wall are selected as a function of a resonance frequency of the second antenna panel to reduce diffraction from the second antennal panel, and
a distance between the first and second L-shaped walls is selected as a function of the resonance frequency of the first antenna panel to reduce a port-to-port coupling.

8. An electronic device comprising:
a massive MIMO antenna comprising:
a substrate;
a first antenna panel coupled on the substrate and comprising an array of first antenna elements;
a second antenna panel coupled on the substrate comprising an array of second antenna elements; and
an antenna isolator coupled on the substrate, the antenna isolator including:
a plurality of walls extending outwardly from the substrate along a length of the substrate between the first antenna panel and the second antenna panel, wherein the plurality of walls includes a T-shaped wall configured to reduce horizontal diffraction between at least two L-shaped walls and wherein the plurality of walls are configured to reduce wave propagation between the array of first antenna elements and the array of second antenna elements,
a first electromagnetic band-gap (EBG) element positioned along an edge of the first antenna panel for the length of the substrate between the first antenna panel and the plurality of walls and configured to reduce surface wave propagation from the array of first antenna elements, wherein the first EBG element includes a plurality of first patches positioned on the substrate and linearly spaced along the edge of the first antenna panel for the length of the substrate, and
a second EBG element positioned along an edge of the second antenna panel for the length of the substrate between the second antenna panel and the plurality of walls and configured to reduce surface wave propagation from the array of second antenna elements;

TX processing circuitry coupled to the first antenna panel and configured to control the array of first antenna elements; and RX processing circuitry coupled to the second antenna panel and configured to control the array of second antenna elements.

9. The electronic device of claim 8, wherein:

the massive MIMO antenna further includes a ground plane, and the first EBG element further includes a plurality of first vias, each first via connects a first patch to the ground plane.

10. The electronic device of claim 9, wherein the second EBG element includes:

a plurality of second patches positioned on the substrate and linearly spaced along the edge of the second antenna panel for the length of the substrate, and a plurality of second vias, each second via connects a second patch to the ground plane.

11. The electronic device of claim 8, wherein:

the T-shaped wall includes:

a first wall that extends outwardly from the substrate along the length of the substrate, a second wall that extends in a first direction from a second end of the first wall that is opposite to a first end of the first wall adjacent to the substrate, and a third wall that extends in a second direction opposite to the first direction from the second end of the first wall.

12. The electronic device of claim 11, wherein:

the at least two L-shaped walls of the plurality of walls of the antenna isolator includes a first L-shaped wall positioned between the T-shaped wall and the first antenna panel, the first L-shaped wall configured to reduce directed path and vertical diffraction from the array of first antenna elements, and the first L-shaped wall includes:

a first wall that extends outwardly from the substrate along the length of the substrate, and a second wall that extends at a second end of the first wall that is opposite to a first end of the first wall adjacent to the substrate in the first direction towards the first antenna panel.

13. The electronic device of claim 12, wherein: the at least two L-shaped walls of the plurality of walls of the antenna isolator further includes a second L-shaped wall positioned between the T-shaped wall and the second antenna panel, and the second L-shaped wall includes:

a first wall that extends outwardly from the substrate along the length of the substrate, and a second wall that extends at a second end of the first wall that is opposite to a first end of the first wall adjacent to the substrate in the second direction towards the second antenna panel.

14. The electronic device of claim 13, wherein:

lengths of extensions from the substrate of the first and second walls of the first L-shaped wall are selected as a function of a resonance frequency of the first antenna panel to reduce diffraction from the first antennal panel, lengths of extensions from the substrate of the first and second walls of the second L-shaped wall are selected as a function of a resonance frequency of the second antenna panel to reduce diffraction from the second antennal panel, and a distance between the first and second L-shaped walls is selected as a function of the resonance frequency of the first antenna panel to reduce a port-to-port coupling.

15. A method of using an antenna, the method comprising:

providing signals to a first antenna panel including an array of first antenna elements coupled to a substrate;

receiving signals from a second antenna panel including an array of second antenna elements coupled to the substrate; and reducing surface wave propagation between the array of first antenna elements and the array of second antenna elements using an antenna isolator coupled on the substrate, the antenna isolator comprising:

a plurality of walls extending outwardly from the substrate along a length of the substrate between the first antenna panel and the second antenna panel, wherein the plurality of walls includes a T-shaped wall configured to reduce horizontal diffraction between at least two L-shaped walls and wherein the plurality of walls are configured to reduce wave propagation between the array of first antenna elements and the array of second antenna elements, a first electromagnetic band-gap (EBG) element positioned along an edge of the first antenna panel for the length of the substrate between the first antenna panel and the plurality of walls and configured to reduce surface wave propagation from the array of first antenna elements, wherein the first EBG element includes a plurality of first patches positioned on the substrate and linearly spaced along the edge of the first antenna panel for the length of the substrate, and a second EBG element positioned along an edge of the second antenna panel for the length of the substrate between the second antenna panel and the plurality of walls and configured to reduce surface wave propagation from the array of second antenna elements.

16. The method of claim 15, further comprising:

coupling a ground plane to the substrate, wherein the first EBG element further includes a plurality of first vias, each first via connects a first patch to the ground plane.

17. The method of claim 16, wherein the second EBG element includes:

a plurality of second patches positioned on the substrate and linearly spaced along the edge of the second antenna panel for the length of the substrate, a plurality of second vias, each second via connects a second patch to the ground plane.

18. The method of claim 15, wherein:

the T-shaped wall includes:

a first wall that extends outwardly from the substrate along the length of the substrate, a second wall that extends in a first direction from a second end of the first wall that is opposite to a first end of the first wall adjacent to the substrate, and a third wall that extends in a second direction opposite to the first direction from the second end of the first wall.

19. The method of claim 18, wherein:

the at least two L-shaped walls of the plurality of walls of the antenna isolator includes a first L-shaped wall positioned between the T-shaped wall and the first antenna panel, the first L-shaped wall configured to reduce directed path and vertical diffraction from the array of first antenna elements, and the first L-shaped wall includes:

a first wall that extends outwardly from the substrate along the length of the substrate, and a second wall that extends at a second end of the first wall that is opposite to a first end of the first wall adjacent to the substrate in the first direction towards the first antenna panel.

20. The method of claim 19, wherein:

the at least two L-shaped walls of the plurality of walls of the antenna isolator further includes a second L-shaped wall positioned between the T-shaped wall and the second antenna panel, and the second L-shaped wall includes:

a first wall that extends outwardly from the substrate along the length of the substrate, and a second wall that extends at a second end of the first wall that is opposite to a first end of the first wall adjacent to the substrate in the second direction towards the second antenna panel.

* * * * *